United States Patent
Bernardos et al.

(10) Patent No.: US 12,418,871 B2
(45) Date of Patent: Sep. 16, 2025

(54) METHODS AND APPARATUS FOR PERFORMING LOCAL LIFECYCLE MANAGEMENT WITH DISTRIBUTED SFC CONTROL

(71) Applicant: InterDigital Patent Holdings, Inc., Wilmington, DE (US)

(72) Inventors: Carlos Jesus Bernardos, Alcorcon (ES); Alain Mourad, Staines-Upon-Thames (GB)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 531 days.

(21) Appl. No.: 17/908,830

(22) PCT Filed: Mar. 3, 2021

(86) PCT No.: PCT/US2021/020596
§ 371 (c)(1),
(2) Date: Sep. 1, 2022

(87) PCT Pub. No.: WO2021/178487
PCT Pub. Date: Sep. 10, 2021

(65) Prior Publication Data
US 2023/0107614 A1     Apr. 6, 2023

Related U.S. Application Data

(60) Provisional application No. 62/986,599, filed on Mar. 6, 2020.

(51) Int. Cl.
*H04W 56/00*     (2009.01)
*H04W 76/25*     (2018.01)

(52) U.S. Cl.
CPC ......... *H04W 56/002* (2013.01); *H04W 76/25* (2018.02)

(58) Field of Classification Search
CPC .... H04W 56/002; H04W 76/25; H04L 45/306
(Continued)

(56) References Cited

U.S. PATENT DOCUMENTS

| | | | | |
|---|---|---|---|---|
| 2008/0086772 A1* | 4/2008 | Chesla | ................... | H04L 63/145 726/23 |
| 2015/0312091 A1* | 10/2015 | Yang | .................... | H04L 41/0668 370/221 |
| 2018/0103091 A1* | 4/2018 | Kwak | ................. | H04L 67/1034 |

FOREIGN PATENT DOCUMENTS

| | | |
|---|---|---|
| TW | 200511757 A | 3/2005 |
| TW | 201143334 A | 12/2011 |

OTHER PUBLICATIONS

Haeffner, W. et al., "Service Function Chaining Use Cases in Mobile Networks draft-ietf-sfc-use-case-mobility-09", Service Function Chaining Internet-Draft, Jan. 2, 2019, 30 pages.
(Continued)

*Primary Examiner* — Mang Hang Yeung
(74) *Attorney, Agent, or Firm* — Volpe Koenig

(57) ABSTRACT

Methods and apparatus for performing local lifecycle management with distributed Service Function Chaining (SFC) control are disclosed. In an example, a method for wireless communications includes determining, in a Service Function Chain, that a first SFC controller of a set of SFC controllers is a primary SFC controller, determining whether at least one trigger condition is satisfied, and selecting, from the set of SFC controllers, a second SFC controller as the primary SFC controller to substitute the first SFC controller based on the at least one trigger condition being satisfied.

18 Claims, 17 Drawing Sheets

(58) Field of Classification Search
USPC .......................................................... 370/350
See application file for complete search history.

(56) References Cited

OTHER PUBLICATIONS

C. Perkins Et Al.,Mobility Support in IPv6, RFC 6275 (Proposed Standard, Jul. 2011, 169 pages.
Gundavelli, S., et al., "Proxy Mobile IPv6", RFC 5213 (Proposed Standard), Aug. 2008, 93 pages.
Farrel, A. et al, "Operating the Network Service Header (NSH) with Next Protocol "None"", Internet Engineering Task Force (IETF), Standards Track, RFC 8393, May 2018, 12 pages.
Quinn et al: "Network Service Header (NSH)" Internet Engineering Task Force (IETF), RFC 8300, Jan. 2018, 29 pages.
Halpern J et al: "Service Function Chaining (SFC) Architecture; rfc7665.txt", Service Function Chaining (SFC) Architecture; RFC7665. TXT, Internet Engineering Task Force, IETF; Standard, Internet Society (ISOC) 4, Rue Des Falaises CH—1205 Geneva, Switzerland, Oct. 20, 2015 (Oct. 20, 2015), pp. 1-32, XP015107717.
Aldrin, S. et al., "Service Function Chaining (SFC) Operations, Administration and Maintenance (OAM) Framework draft-ieft-sfc-oam-framework-11", Internet Engineering Task Force, Internet-Draft, Sep. 19, 2019, 24 pages.
"3rd Generation Partnership Project; Technical Specification Group Services and System Aspects; Architecture enhancements for 5G System (5GS) to support network data analytics services (Release 16)", 3GPP TS 23.288 V16.2.0 (Dec. 2019), Dec. 2019, 57 pages.

\* cited by examiner

| Ver | O | U | TTL | Length | U | U | U | U | MD Type | Next Protocol | |
|---|---|---|---|---|---|---|---|---|---|---|---|
| Service Path Identifier ||||||||||| Service Index |
| Variable-Length NS Lifecycle Management Commands ||||||||||||

| NS Lifecycle cmd | Type | U | Length |
|---|---|---|---|
| Variable-Length Metadata ||||

| | Type = TBA | Option Length |
|---|---|---|
| Service Path Identifier (SPI) | | Service Index |
| Network Service ID | | |

FIG. 18

| | Type = TBA | Option Length |
|---|---|---|
| Function ID Length | | Node ID Length |
| Function ID | | |
| Node ID | | |

FIG. 19

METHODS AND APPARATUS FOR PERFORMING LOCAL LIFECYCLE MANAGEMENT WITH DISTRIBUTED SFC CONTROL

CROSS-REFERENCE TO RELATED APPLICATION(S)

This application is a U.S. national stage application under 35 U.S.C. 371 of International Patent Application No. PCT/US2021/020596, filed Mar. 3, 2021, which is a non-provisional filing of, and claims priority to and the benefit of U.S. Provisional Application No. 62/986,599 filed in the U.S. Patent and Trademark Office on Mar. 6, 2020, the entire content of each of which is being incorporated herein by reference as if fully set forth below in its entirety and for all applicable purposes.

SUMMARY

The invention generally relates to communication networks, wireless and/or wired. For example, one or more embodiments disclosed herein are related to methods and apparatus for performing local lifecycle management with distributed Service Function Chaining (SFC) control.

In one embodiment, a method of distributed SFC control in wireless communications includes determining, in a Service Function Chain, that a first SFC controller of a set of SFC controllers is a primary SFC controller, determining whether at least one trigger condition is satisfied, and selecting/reselecting, from the set of SFC controllers, a second SFC controller as the primary SFC controller to substitute the first SFC controller based on the at least one trigger condition being satisfied. In an example, the second SFC controller is selected based on information related to any of a service-specific configuration or a network service (NS) associated with the primary SFC controller. In one embodiment, at least one of the first SFC controller and the second SFC controller is a distributed SFC pseudo controller, and/or at least one of the first SFC controller and the second SFC controller is a centralized SFC controller.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein:

FIG. 18 is a diagram illustrating an exemplary format of a Network Service ID option, according to one or more embodiments; and FIG. 19 is a diagram illustrating an exemplary format of an SFC node option, according to one or more embodiments;

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Communications Networks and Devices

The methods, apparatuses and systems provided herein are well-suited for communications involving both wired and wireless networks. Wired networks are well-known. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
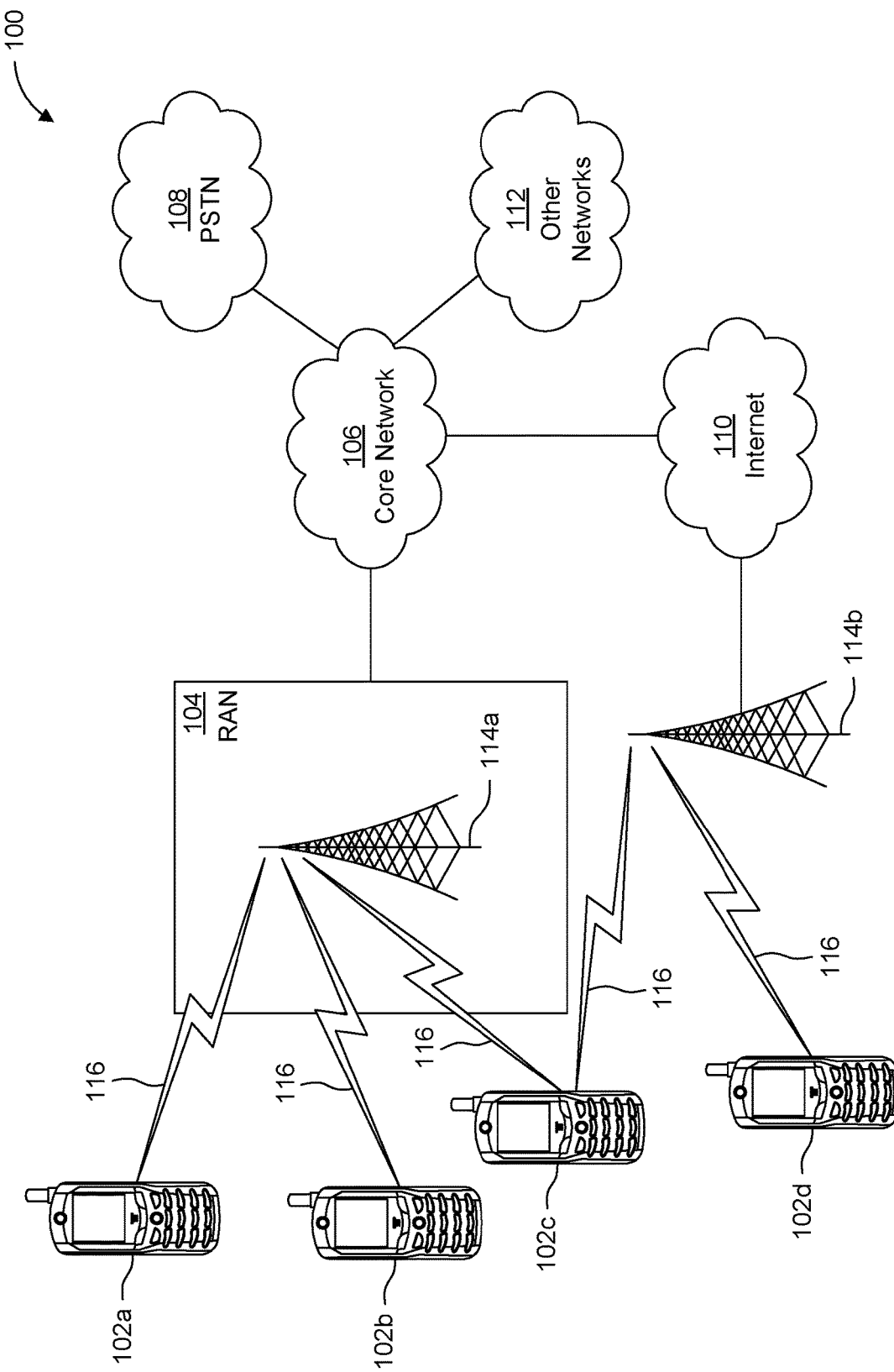
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a New Radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (M IMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, a Home Node B, a Home eNode B, or an access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR, etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
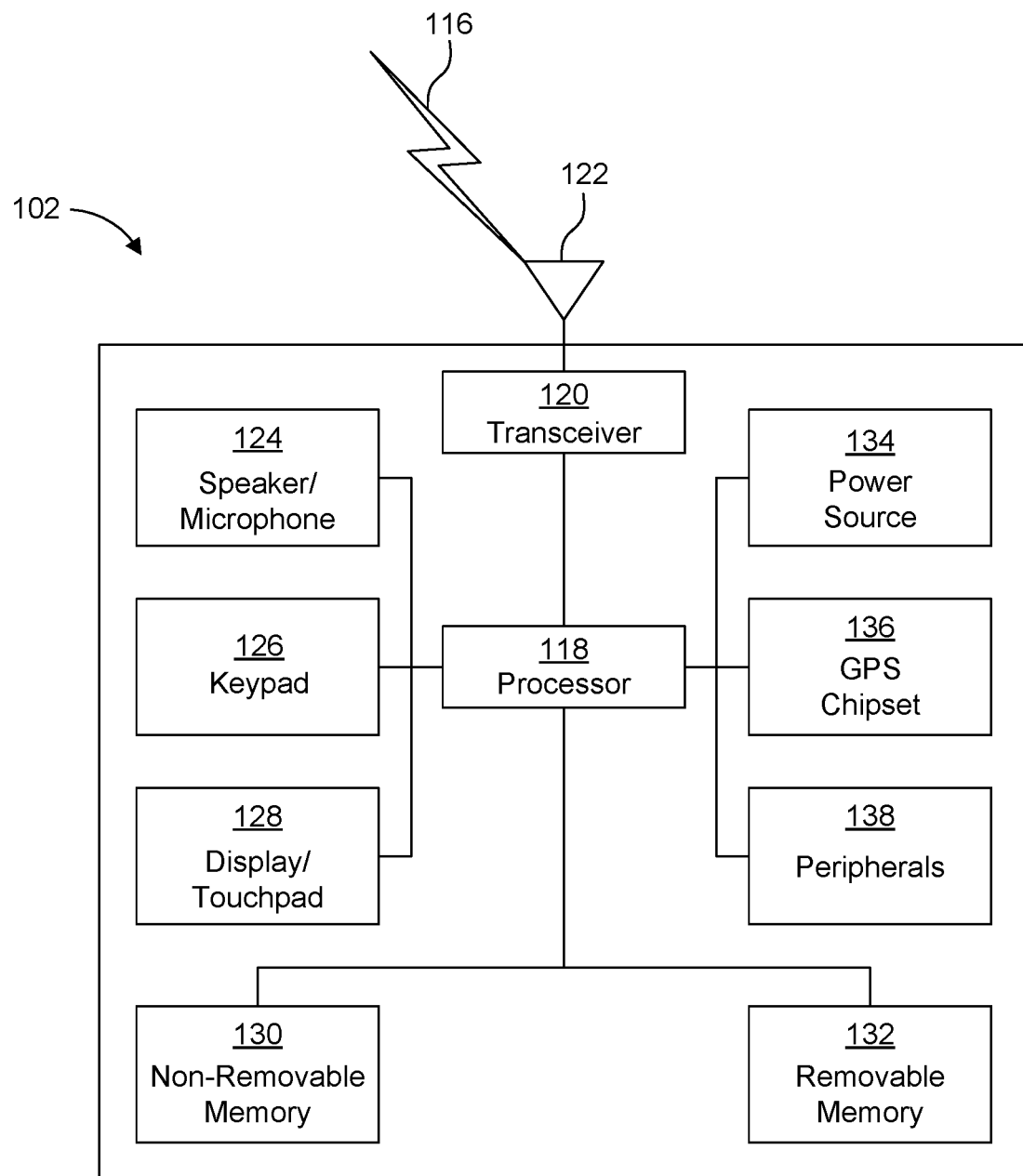
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
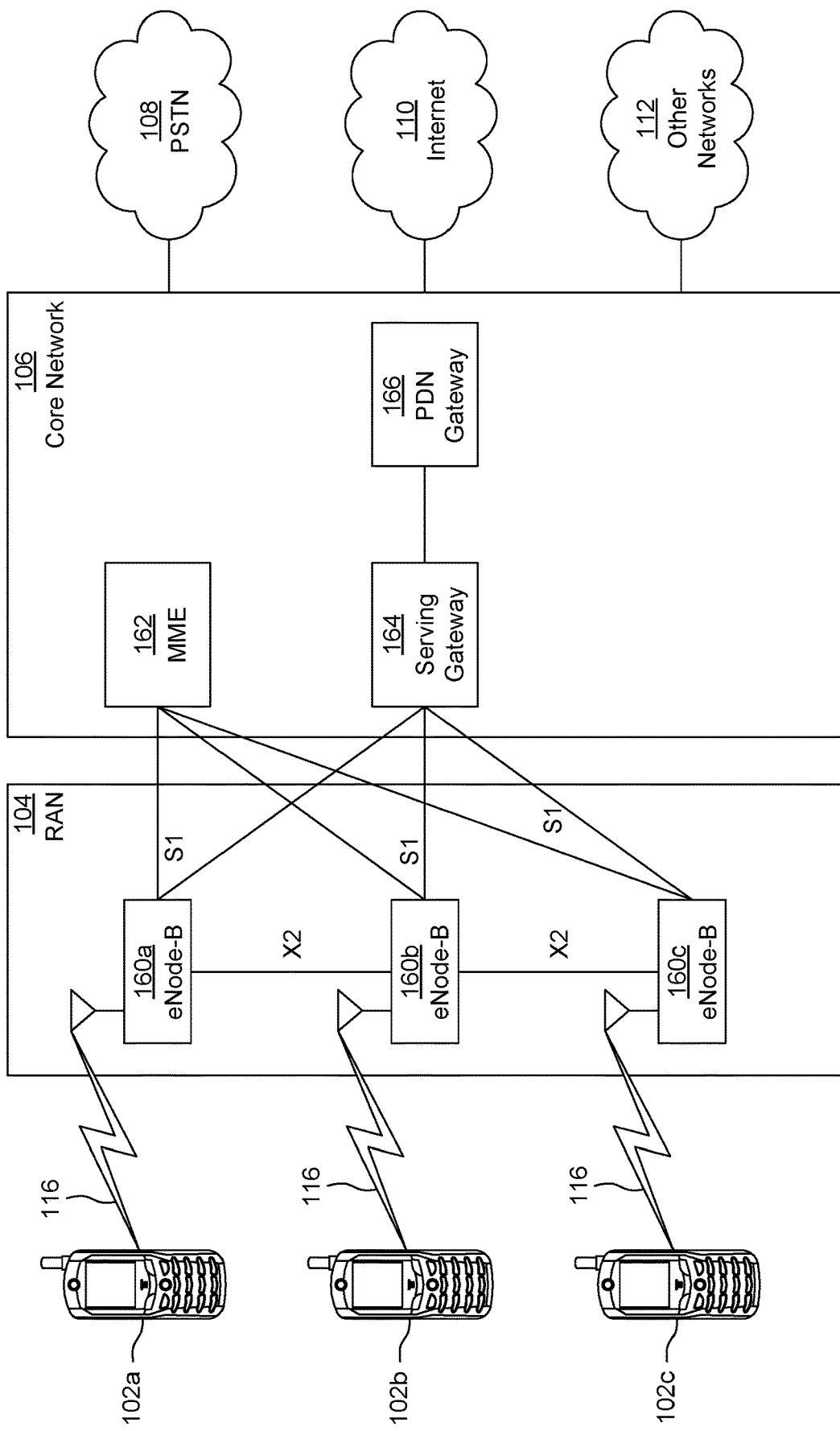
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
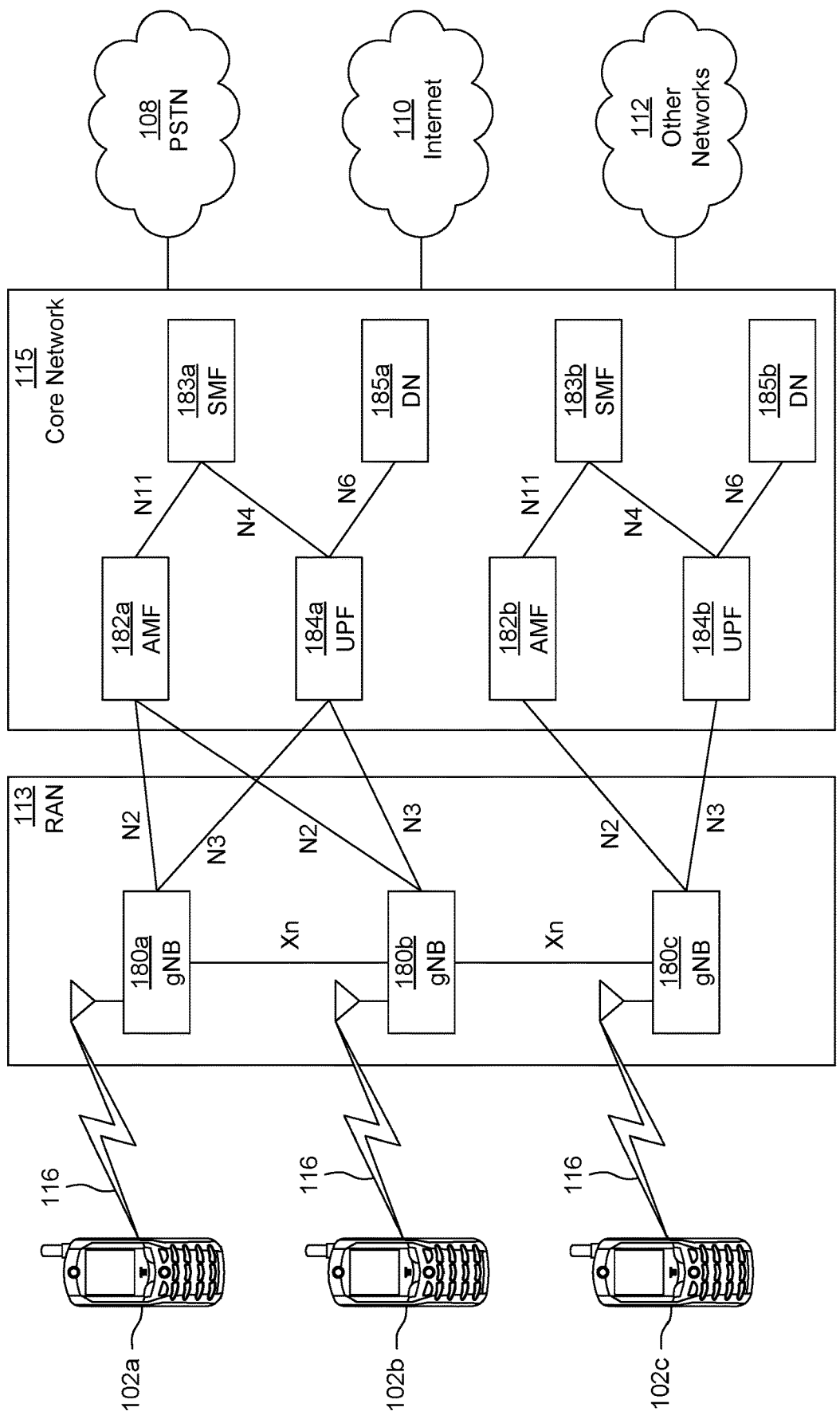
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a,184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 182 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a*-*d*, Base Station 114*a*-*b*, eNode-B 160*a*-*c*, MME 162, SGW 164, PGW 166, gNB 180*a*-*c*, AMF 182*a*-*b*, UPF 184*a*-*b*, SMF 183*a*-*b*, DN 185*a*-*b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Service Function Chaining

Service Functions (SFs) are widely deployed and essential in many networks. SFs may provide a range of features such as security, wide area network (WAN) acceleration, and/or server load balancing. SFs may be instantiated at one or more different points in the network infrastructure such as data centers, the WAN, the core network (CN), the RAN, and on mobile nodes or devices (e.g., WTRUs or UEs).

SFs, also referred to as Virtualized Network Functions (VNFs), or functions, are hosted on computing, storage and networking resources. SFs are becoming more prevalent, even in traditionally closed environments, such as cellular networks which are now embracing cloud native technology. Therefore, in some 5G-based systems, SFs may be referred to as Network Functions Services (or NF Services), and these NF Services can be accessed using mainstream Internet protocols such as Hypertext Transfer Protocol (HTTP). The hosting environment of a function disclosed herein is called Service Function Provider or Network Function Virtualization (NFV) Infrastructure Point of Presence (NFVI-PoP) (e.g., using ETSI NFV terminology). Services are typically formed as a composition of SFs (or VNFs), with each SF providing a specific function of the whole service. Services also referred to as Network Services (NSs), e.g., according to ETSI terminology.

With the arrival of virtualization, the deployment model for services (e.g., NSs) is evolving to one where the traffic is steered through the SFs wherever the network functions are deployed. In some examples, functions (e.g., SFs) do not need to be deployed in the traffic path. For a given service (e.g., an NS), the abstracted view of required SFs (and the order and/or sequence in which the required SFs apply or to be applied) is called a Service Function Chain (SF Chain) (see, e.g., Ref. [1]), which is also called network function forwarding graph (NF-FG) in ETSI. In an SF Chain, packets, frames, and/or flows may be sent through a given set of ordered SFs. For example, an SF Chain is instantiated through a selection of specific SF instances on one or more specific network nodes to form a service graph, which is called a SF path (SFP). The SFs may be applied at any layer within the network protocol stack (e.g., a network layer, a transport layer, and/or an application layer).

In various embodiments, an SFC controller functionality may be implemented logically by an ETSI NFV orchestrator (NFVO), or by a separate logical entity. The mechanisms defined or disclosed in various embodiments, including signaling extensions, may be used or applied for IETF SFC, ETSI NFV, and/or any other applicable procedures defined by a standard for communication networks.

Fog Computing

The concept of fog computing has emerged, driven by the Internet of Things (IoT) due to the need of handling the data generated from end-user devices (e.g., WTRUs, UEs, or drones). The term fog refers to any networked computational resource in the continuum between things and cloud. A fog node may therefore be an infrastructure network node, such as an eNodeB, a gNodeB/gNB, an edge server, a customer premises equipment (CPE), or even a terminal node such as a WTRU, a laptop, a smartphone, or a computing unit on-board a vehicle, robot or drone. In fog computing, the functions (e.g., SFs) composing an SFC are hosted on resources that are inherently heterogeneous, volatile and/or mobile, which means that resources might appear and disappear, and the connectivity characteristics between these resources may also change dynamically.

In an aspect, while an ETSI Multi-access Edge Computing (MEC) approach provides computation capabilities near the end users via static substrates (e.g., data centers or servers) deployed at the edge of a network, the fog extends this approach to encompass and integrate the computational substrates scattered further down the static edge, such as in mobile terminal devices (e.g., WTRUs, UEs), CPEs, or local servers.

IP Mobility and SFC Control

In some current implementations, Internet Protocol (IP) mobility mechanisms, such as Mobile IPv6 (see, e.g., Ref. [3]) and Proxy Mobile IPv6 (see, e.g., Ref. [4]), are used to support the mobility of a host within an IP infrastructure. One IP mobility mechanism is based on hosts having two addresses: a permanent address (called a home address (HoA)), and a temporal address (called a care-of address (CoA)) which is acquired at each visited network where a mobile node (MN) roams. Every time the MN moves to a new network, the MN sends a signaling message (called Binding Update, or BU) to a router located on the network where the HoA is topologically valid. This router is called a home agent (HA) that is in charge of redirecting the traffic to the current location of the MN (e.g., when the MN roams away from the home network of the MN). The HA sends back to the MN another signaling message (called Binding Acknowledgement, or BA) indicating that whether the process was successful. If so, the HA starts redirecting the traffic (e.g., the traffic addressed to the MN's HoA and received by the HA) to the current CoA of the HA. The MN follows the same approach for uplink traffic, for example, sending the uplink traffic via a tunnel (e.g., a tunnel connected with the HA) to the HA.

Network Service Header (NSH)

A Network Service Header (NSH) is used on packets or frames to realize Service Function Paths (SFPs). For example, an SFP may be a path followed by traffic belonging to an SF Chain. The NSH may provide a mechanism for metadata exchange along the instantiated service paths. The NSH is the SFC encapsulation required to support an SFC architecture.

Figure 2:
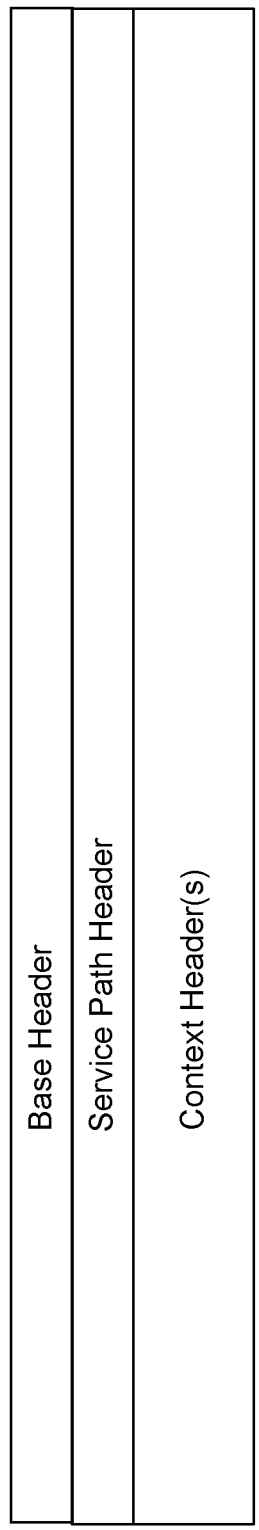
FIG. 2 is a diagram of an example of a Network Service Header (NSH) used in a Service Function (SF) Chain, according to one or more embodiments.

The NSH may include (or be composed of) a 4-byte Base Header, a 4-byte Service Path Header, and/or Context Headers, as shown in FIG. 2. The Base Header field provides information about the service header and the payload protocol. The Service Path Header field provides path identification(s) and location(s) within a service path (SP). The Context Header field carries metadata (e.g., context data) along an SP.

While an NSH is typically used to encapsulate data packets, an NSH can also be used to carry metadata on an SFP without the need for payload data [9]. This mechanism enables diagnosis and monitoring of SFPs, and coordination between two or more SFC-aware nodes.

SFC Architectures and Mechanisms

In some current architectures and/or mechanisms, SFCs are configured and managed by a centralized controller/orchestrator (e.g., an SFC Controller function or control plane). This implies that dynamic changes on the SFC (e.g., composition, function migration, and/or scaling) can only be performed by the centralized controller, and the centralized controller needs constant connectivity with the SFs and updated information on the status of all the nodes hosting the SFs. In addition, multiple services are managed by the same controller/orchestrator, even if different services provide different functionalities with disparate requirements.

In a fog environment, with some current management and orchestration mechanisms, SFCs cannot operate if the nodes hosting the functions (e.g., SFs) get disconnected from the infrastructure. This implies that the lifecycle management of an SFC cannot be managed if disconnected from the centralized controller, which means that important actions (e.g., scaling, migrating a function or updating the data plane) may not take place due to the lack of connectivity with the centralized controller/orchestrator, even if connectivity issues are just temporal in some cases. Additionally, lifecycle management of SFCs requires up-to-date monitoring information, with a refresh frequency that is service-specific, and may involve a very high overhead with the centralized controller. This severely limits the capability of fast reacting to events local to the nodes that are hosting the functions, as the SFC cannot autonomously self-orchestrate (e.g., decisions can only be taken by the centralized controller/orchestrator).

Figure 3:
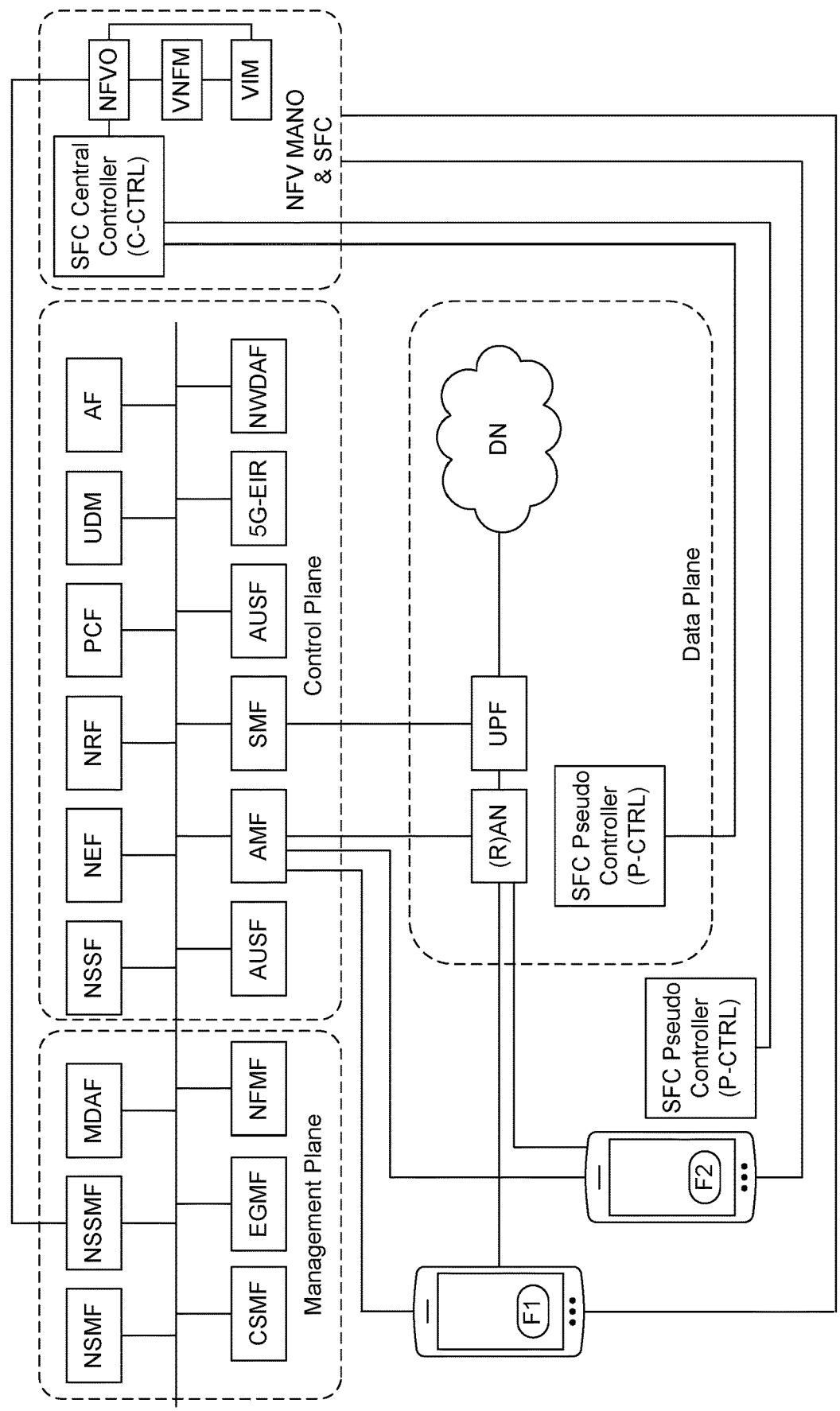
FIG. 3 is a system diagram illustrating an exemplary wireless communications system having a 3GPP network architecture being integrated with ETSI NFV MANO and IETF SFC stacks, according to one or more embodiments.

Mobile network architectures are evolving to support network virtualization and service function orchestration. Referring to FIG. 3, a current 3GPP network architecture (e.g., 5G network architecture) is integrated with an ETSI NFV management and network orchestration (MANO) and IETF SFC stacks. The 3GPP network architecture includes a management plane, a control plane, and a user/data plane. Plugged into this 3GPP network architecture, virtualization enables to instantiate, chain and properly orchestrate virtual network functions (VNFs) running at the network infrastructure and the WTRUs, which involves the ETSI NFV and IETF SFC management and orchestration plane, as shown in FIG. 3.

As discussed above, some current SFC architectures rely on a centralized controller/orchestrator (C-CTRL) which are connected to all the hosts participating in a given SF chain. These centralized SFC architectures pose issues and inefficiencies in fog computing environments especially because of the mobility and volatility of some hosts, as well as the associated signaling overhead(s).

In some implementations, centralized SFC architectures may be alleviated by enabling autonomous SFC self-orchestration (SOC), based on the concept of SFC pseudo controller (P-CTRL) (see, e.g., Ref. [5]). A pseudo controller is capable of (at least temporarily and/or partially) substituting the centralized controller. For example, an SFC pseudo controller may substitute a centralized SFC controller in situations where the centralized SFC controller is not able to perform its functions (e.g., when the connectivity between the centralized SFC controller and some hosts is broken).

In various embodiments, one or more SFC pseudo controllers or P-CTRLs (e.g., a service-specific SFC pseudo controller) may be selected and initialized among host nodes that are participating in the SF Chain. In various embodiments, one or more SFC pseudo controllers or P-CTRLs may be used or enabled to perform distributed SFC control. For example, various SFC mechanisms disclosed herein may enable an SFC pseudo controller trigger, and/or configure one or more SFC pseudo controllers to control NS lifecycle management operations, such as migration of NS functions, chains or parts of a chain.

Figure 4:
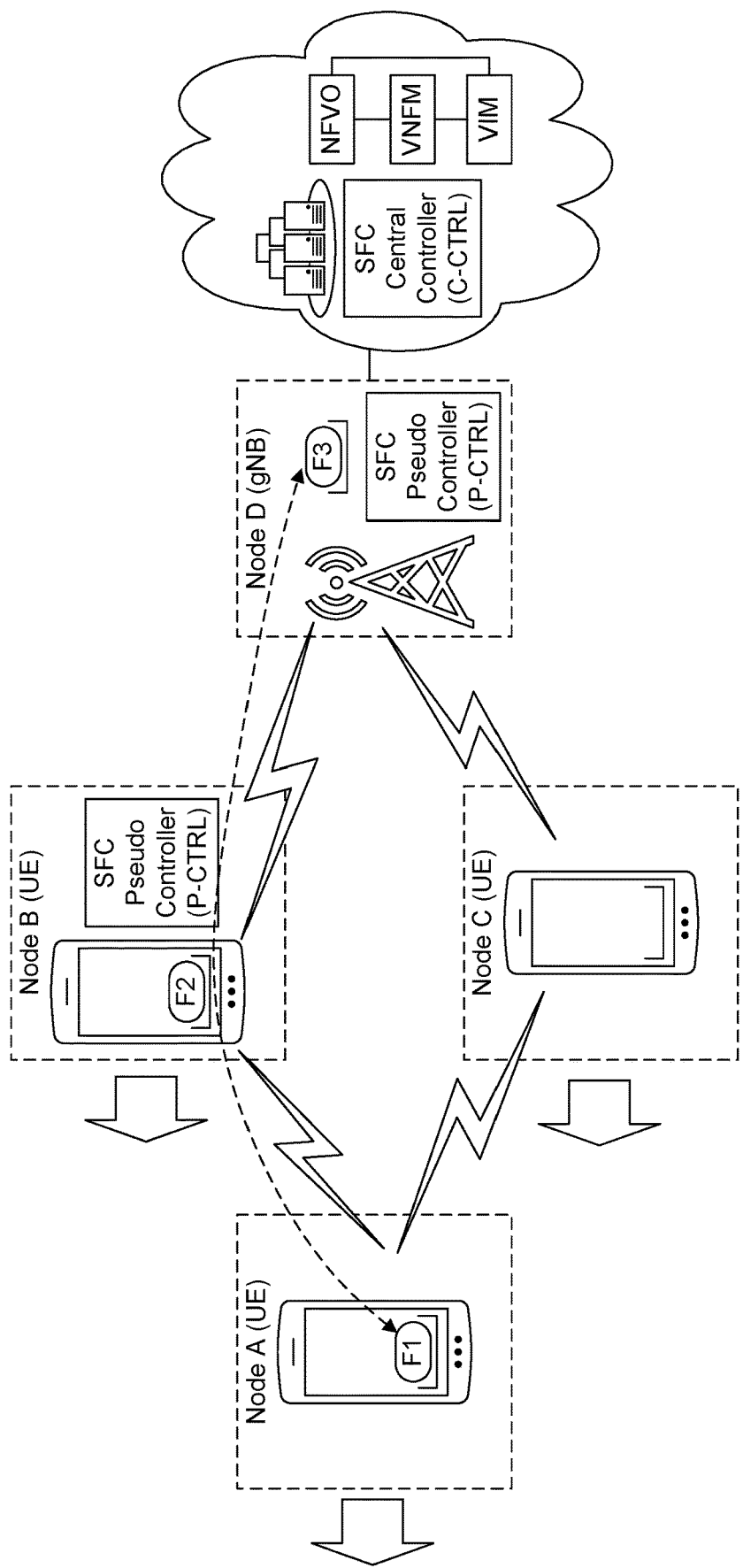
FIG. 4 is a system diagram illustrating an exemplary wireless communications system having disrupted SFC due to mobility, according to one or more embodiments.

Referring to FIG. 4, in an example, an SF Chain is disrupted due to mobility. In this example, a host node (e.g., a WTRU or a UE, or a gNB) makes use of an NS composed of a chain of SFs: F1-F2-F3. These SFs may be application functions, network functions, and/or over-the-top functions. Non-limiting examples of these functions may include any of: load balancers, traffic steering, performance enhancement proxies (PEPs), video transcoders, firewalls, etc. (see, e.g., Ref. [6]). F1 instance runs on a first node (node A, or a first WTRU), F2 instance runs on a second node (node B, or a second WTRU), and F3 instance runs on a third node (node D, or a gNB). SFC pseudo controller instances are assumed to be running on the node B and the node D. The node A connects two nodes, the node B and the node C, via device-to-device (D2D) communications. If all the mobile nodes (e.g., nodes A, B, and C) move out of the coverage of the node D (the gNB), the service or SF Chain will then need to be reconfigured to maintain service continuity as the node D (the gNB) is hosting one function (F3) of the SF Chain and would become disconnected. Because the node D (the gNB) is providing all the mobile nodes (e.g., nodes A, B, and C) with connectivity to the network infrastructure where the SFC central controller is hosted, this type of event (e.g., the nodes A, B, and C moving out of the coverage of the node D) may not be resolved by the SFC central controller, as the node(s) (e.g., nodes A and B) hosting the functions would be disconnected from the SFC central controller. Similar situations may arise in highly mobile/volatile and/or latency-demanding scenarios, where centralized lifecycle management becomes unsuitable.

In various embodiments, migrating the SFC pseudo-controller functionality running at the node D (the gNB) to another node participating in the SF Chain may be desired. In various embodiments, an SFC pseudo controller may substitute (at least temporarily and/or partially) the centralized SFC controller when the centralized SFC controller is not available or is unable to perform a given task. In various embodiments, one or more SFC pseudo controllers may be enabled to perform NS lifecycle management operations, such as migration of functions, SF Chains, or parts of an SF Chain.

In various embodiments, when a centralized SFC controller (C-CTRL) is in charge, new or improved mechanisms and/or signaling exchanges may be needed among the C-CTRL, one or more SFC pseudo-controllers (P-CTRLs), and/or the nodes (e.g., the nodes in the SF Chain), in order to facilitate a seamless transition from the C-CTRL to one or more P-CTRLs (e.g., due to a trigger/event, such as a failure of the C-CTRL). When a P-CTRL take over the functionality from the C-CTRL, new or improved mechanisms and/or signaling exchanges may be needed for the P-CTRL towards other P-CTRLs, in order to sustain a seamless transition if the P-CTRL fails. For example, the functionality of the C-CTRL may be moved or shifted from the failed P-CTRL to another P-CTRL to sustain a seamless transition. In some cases, when the C-CTRL is back into the picture (e.g., the C-CTRL is available or is able to perform the given task), the control functionality may be transferred seamlessly back from a P-CTRL to the C-CTRL.

Representative Procedure for Distributed SFC Control

In various embodiments, one or more SFC pseudo controllers (P-CTRLs) may temporarily and/or partially take over functionality from the centralized SFC controller (C-CTRL) to perform NS lifecycle management or management decisions. In various embodiments, the definition, selection, and initialization of a P-CTRL may be found, for example, in Ref. [5].

Figure 5:
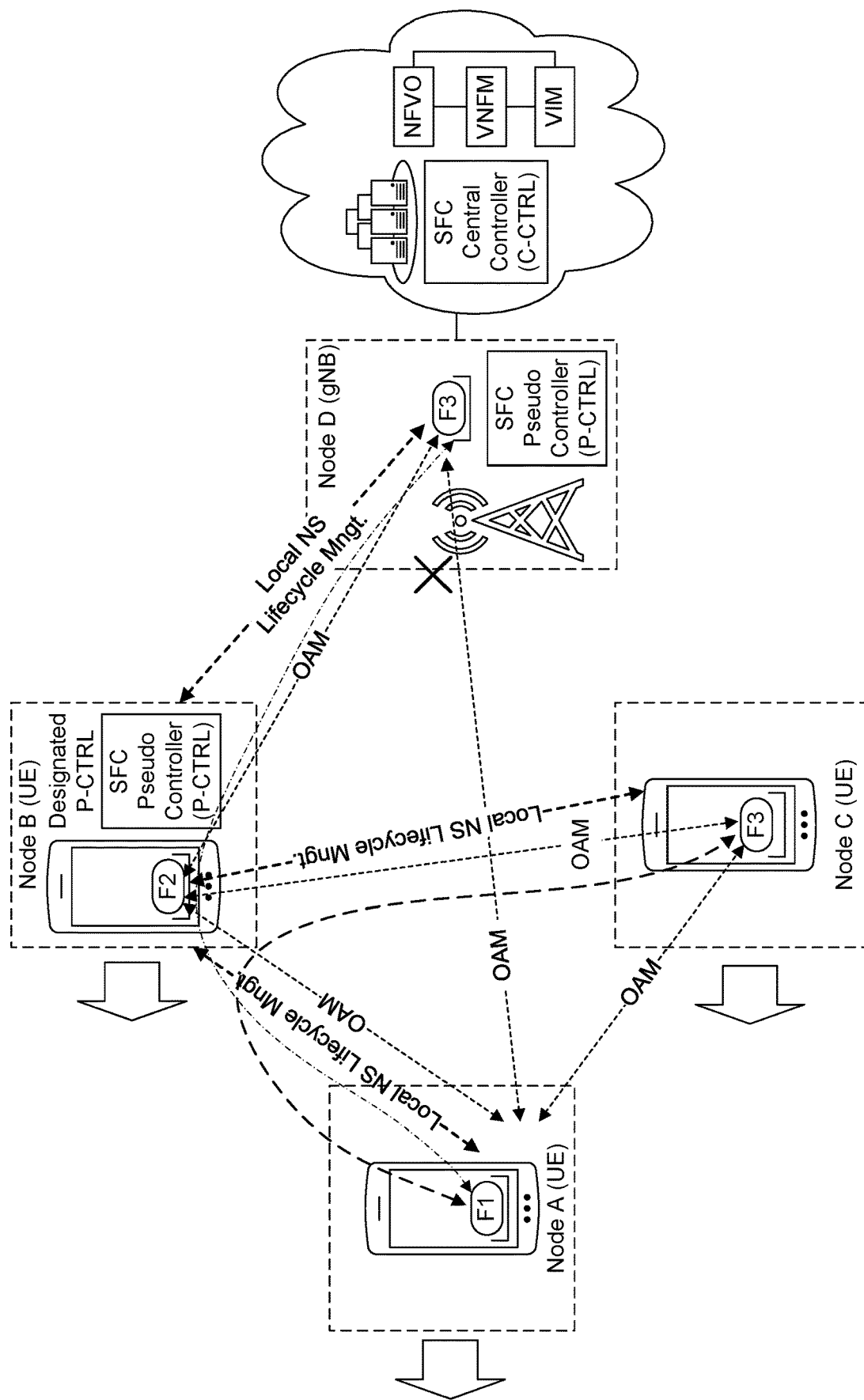
FIG. 5 is a system diagram illustrating an exemplary wireless communications system having local NS lifecycle management, according to one or more embodiments.

Referring to FIG. 5, mechanisms to perform local NS lifecycle management are provided. In an example, a service function (F3) is migrated from a node D (e.g., a gNB) to a node C (e.g., a first WTRU), triggered by the move of a node A (e.g., a second WTRU, hosting F1) and a node B (e.g., a third WTRU, hosting F2) away from the coverage of the node D that hosts F3. The P-CTRL in the node B may perform Operations, Administration and Maintenance (OAM) operations locally and may monitor one or more NS-specific Service Level Agreements (SLAs). Upon detecting or predicting that one or more NS-specific SLAs may not be met in the near future, a SFC pseudo controller (e.g., the P-CTRL in the node B) may take actions to temporarily and/or partially substitute the centralized SFC controller (C-CTRL), and start performing local NS lifecycle management operations. For example, the P-CTRL in the node B may instantiate the service function F3 on the node C, because the current hosting node, the node D, is predicted to become unreachable to other nodes (e.g., nodes A, B, and/or C) soon.

In various embodiments, the prediction and local NS lifecycle management operations may have been performed by a P-CTRL running at the node D. In an example, the active or designated P-CTRL may be running at the node B and/or the node D, which would imply the need to also migrate the active P-CTRL role to the node B. Enabling the P-CTRL in the node B to perform local NS lifecycle management decisions (e.g., migrating any active P-CTRL role from the node D to the node B), the service/SFs could be continued when the C-CTRL fails or is out of reach.

In various embodiments, the activation of P-CTRL operations (e.g., to perform local NS lifecycle management) may only occur when the C-CTRL cannot properly operate (e.g., the C-CTRL is disconnected from the SF Chain or is not reacting fast enough to the local changing conditions). For example, a P-CTRL may send a scaling command to a given node, in order to adapt the resources to the current NS demands. The P-CTRL may also notify this (sending the scaling command to a given node) to the C-CTRL, as soon as the connection to the C-CTRL is recovered so that both the C-CTRL and the P-CTRL are synchronized.

In various embodiments, in order to support the operations of P-CTRLs complementing or replacing the management operations/functionality of the C-CTRL, any of the following operations may be performed:

When an NS is onboard, the C-CTRL may receive an NS descriptor (NSD) together with one or more VNF descriptors (VNFDs) of the functions composing the NS, and an Operations, Administration and Maintenance Descriptor (OAMD), which includes the information of what needs to be monitored to ensure a given SLA.

When the NS is instantiated, in addition to the regular orchestration decisions (e.g., placement of functions on available resources, etc.), the C-CTRL, based on its knowledge of existing P-CTRLs, may decide whether and/or how monitoring is going to be performed, including any of:

What is monitored by each P-CTRL node (e.g., vCPU load, bandwidth of a certain link, etc.), and how (e.g., active, passive or hybrid monitoring);

Which orchestrators are in charge of collecting and processing measurements;

Depending on the requirements, certain monitoring may only be performed by P-CTRLs running on one or more selected nodes or nodes that are closer to the P-CTRLs; and/or Monitoring may be processed by multiple orchestrators, for resiliency purposes.

As shown in FIG. 3, the ETSI NFV MANO and IETF SFC stacks may directly interact with the 3GPP management, control and data planes, for example, in a 5G mobile network architecture. However, some current implementations assume a semi-static environment and the standardized message flows do not support dynamic migration of the SFC controller role to other entities. Therefore, new signaling flows, for example, signaling flows between C-CTRL and P-CTRLs and in-between P-CTRLs may be desired. In various embodiments, the new signaling flows may: (i) allow prediction of events via local monitoring and/or faster reaction, (ii) enable orchestration when the C-CTRL is temporarily unreachable or unavailable, (iii) support migrating a C-CTRL role to one or more P-CTRLs (and gaining back the control by the C-CTRL), and/or (iv) support migrating a P-CTRL role between P-CTRLs.

Figure 6:
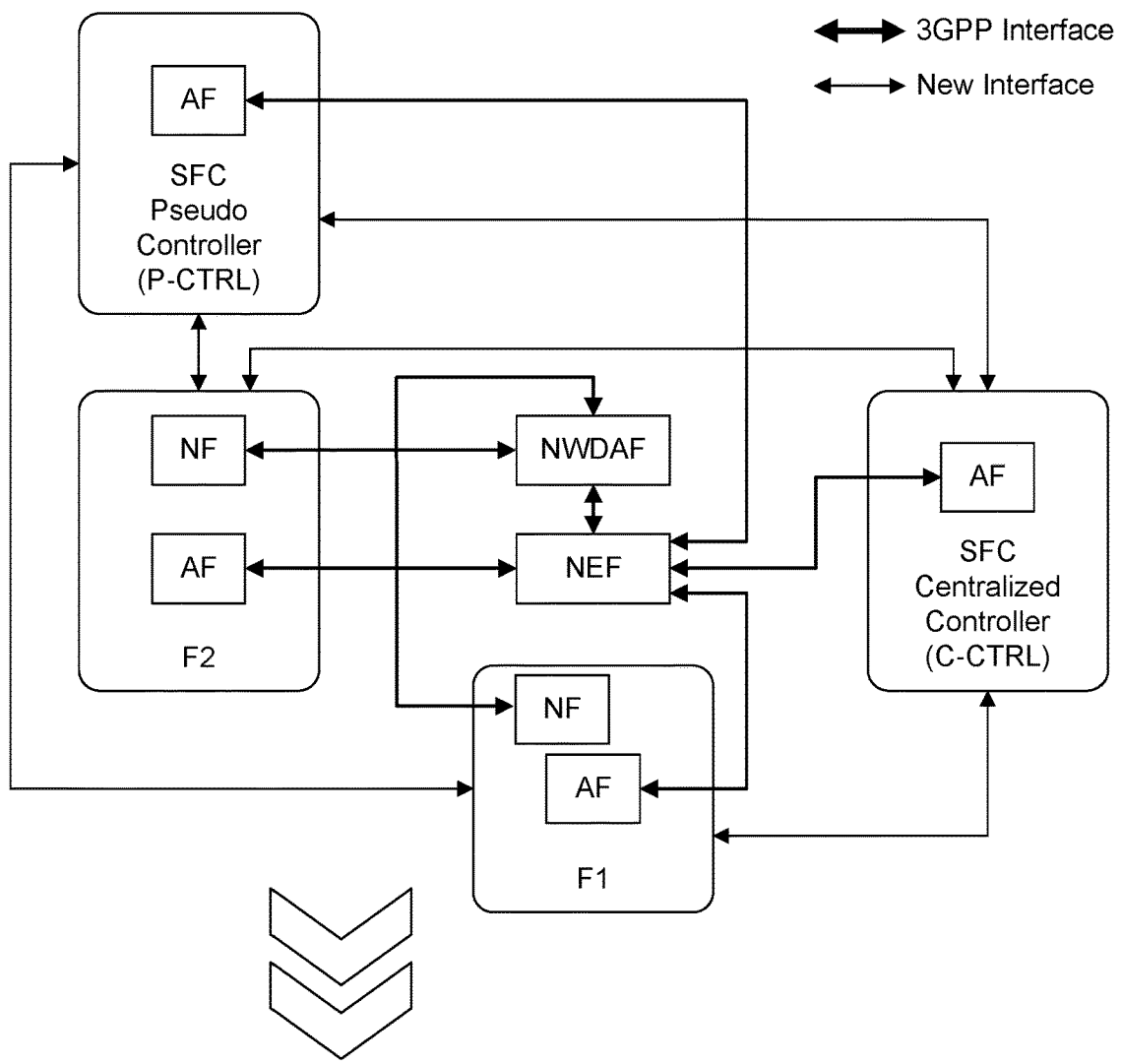
FIG. 6 is a block diagram illustrating an example of signaling mechanisms and mapping between functional entities and the functions specified by one or more standards, according to one or more embodiments.
Figure 6:
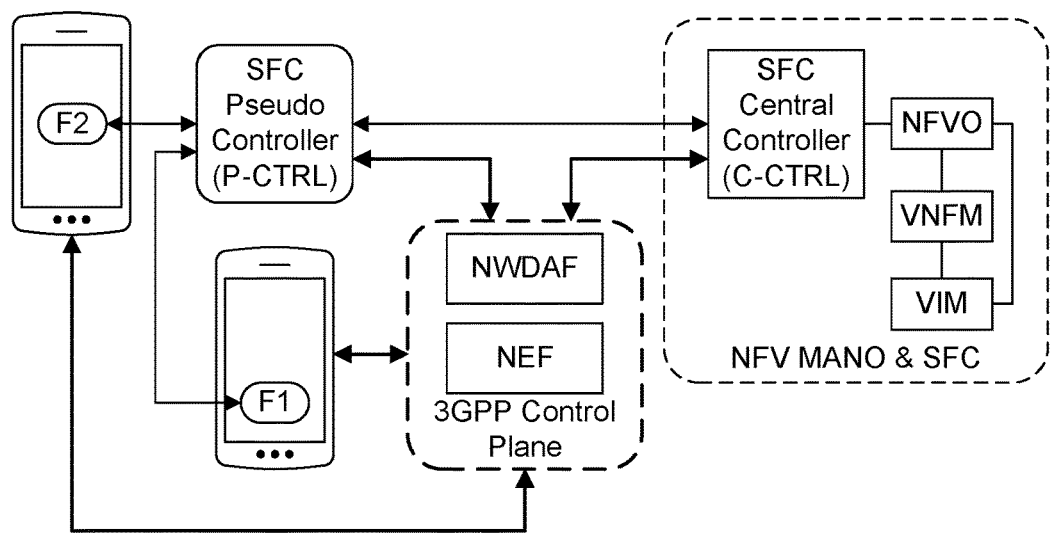

FIG. 6 shows an example of mapping between the functional entities used in distributed SFC control and the functions specified by 3GPP. In various embodiments, a function (e.g., F1 or F2) discussed herein may map to an Application Function (AF) or a Network Function (NF) in 3GPP. P-CTRLs and C-CTRLs behave like an over-the-top AF, and may, for example, influence WTRU traffic routing and steering, via a network exposure function (NEF) or directly to the required control plane network functions (NFs). FIG. 6 also shows that there are both 3GPP and newly defined IETF SFC signaling mechanisms involved to enable local NS lifecycle management. These mechanisms are described in more detail in the following.

In various embodiments, signaling procedures and mechanisms are provided for in distributed SFC control. For example, a P-CTRL may take over C-CTRL, and may reverse the control after taking over by the P-CTRL (e.g., the C-CTRL taking control back). The signaling procedures and mechanisms may include any of: how to transfer the control from one P-CTRL to another P-CTRL (e.g., an inter P-CTRL handover); how to perform local lifecycle operations using in-band extending NSH; and how to perform function migration extending (out-of-band) Mobile IPv6 signaling.

In various embodiments, a method of distributed SFC control in wireless communications includes determining, in a Service Function Chain, that a first SFC controller of a set of SFC controllers is a primary SFC controller, determining whether at least one trigger condition is satisfied, and selecting/reselecting, from the set of SFC controllers, a second SFC controller as the primary SFC controller to substitute the first SFC controller based on the at least one trigger condition being satisfied. In an example, the second SFC controller is selected based on information related to any of a service-specific configuration or a network service (NS) associated with the primary SFC controller. In one embodiment, at least one of the first SFC controller and the second SFC controller is a distributed SFC pseudo controller, and/or at least one of the first SFC controller and the second SFC controller is a centralized SFC controller. In an example, the first SFC controller is a centralized SFC controller, and the second SFC controller is a distributed SFC pseudo controller. In another example, the first SFC controller is a distributed SFC pseudo controller, and the second SFC controller is a centralized SFC controller. In some cases, each of the first SFC controller and the second SFC controller is a respective (or different) distributed SFC pseudo controller. The second SFC controller may communicate with one or more SFC controllers of the set of SFC controllers, and/or continuously perform local monitoring.

In one embodiment, the method includes receiving an OAMD from the first SFC controller, and determining, based on the received OAMD, one or more service-specific monitoring actions to be performed, and/or determining the service-specific configuration based on the received OAMD. In one embodiment, the method includes performing the one or more service-specific monitoring actions based on the received OAMD. The one or more service-specific monitoring actions may comprise any of: 1) a service-specific local OAM monitoring, or 2) obtaining one or more OAM metrics.

In various embodiments, the trigger condition discussed herein may comprise any of: a local monitoring event being detected; a determination of a local monitoring event being failed to be detected; a failure of the first SFC controller being detected; and/or a failure of the first SFC controller being predicted using local monitoring information.

In various embodiments, the trigger condition discussed herein may comprise any of: a local monitoring event is detected by the first SFC controller or the second SFC controller; a local monitoring event is failed to be detected by the first SFC controller or the second SFC controller; a failure of the first SFC controller is detected by the second SFC controller; and/or a failure of the first SFC controller is predicted by the second SFC controller using the local monitoring information.

In various embodiments, the failure of the first SFC controller may be detected by the second SFC controller based on any of: 1) signaling one or more periodic keep-alive messages between the first SFC controller and the second SFC controller; 2) a transport-layer mechanism that allows detecting connectivity failures; and/or observing a lack of action from the first SFC controller upon an event that requires an orchestration action.

In one embodiment, the method may also include determining, by the first SFC controller, that the first SFC controller is unable to operate as the primary SFC controller; sending, by the first SFC controller, a notification message to at least the second SFC controller using an SFC Network Service Header (NSH) extension; receiving, by the first SFC controller from at least the second SFC controller, a response message after sending the notification message; and selecting (or reselecting), by the first SFC controller, the second SFC controller as the primary SFC controller based on the received response message.

In various embodiments, a WTRU (a WTRU 102, or a UE) for wireless communications may perform distributed SFC control discussed herein. For example, the WTRU may be configured to (e.g., via a processor): determine, in a Service Function Chain, that a first Service Function Chaining (SFC) controller of a set of SFC controllers is a primary SFC controller; determine whether at least one trigger condition is satisfied; and select (or reselect), from the set of SFC controllers, a second SFC controller as the primary SFC controller to substitute the first SFC controller based on the at least one trigger condition being satisfied. In an example, the second SFC controller may be selected based on information related to any of: 1) a service-specific configuration, or 2) a network service (NS) associated with the primary SFC controller. The WTRU may comprise at least one of the first SFC controller and the second SFC controller.

In one embodiment, at least one of the first SFC controller and the second SFC controller is a distributed SFC pseudo controller, and/or at least one of the first SFC controller and the second SFC controller is a centralized SFC controller. In an example, the first SFC controller is a centralized SFC controller, and the second SFC controller is a distributed SFC pseudo controller. In another example, the first SFC controller is a distributed SFC pseudo controller, and the second SFC controller is a centralized SFC controller. In some cases, each of the first SFC controller and the second SFC controller is a respective (or different) distributed SFC pseudo controller. The second SFC controller may communicate with one or more SFC controllers of the set of SFC controllers, and/or continuously perform local monitoring.

In one embodiment, the WTRU may be configured (e.g., via a receiver) to receive an OAMD from the first SFC controller, and to determine one or more service-specific monitoring actions to be performed and/or the service-specific configuration based on the received OAMD. In an example, the WTRU is configured to perform the one or more service-specific monitoring actions based on the received OAMD. The one or more service-specific monitoring actions may comprise any of: 1) a service-specific local OAM monitoring, or 2) obtaining one or more OAM metrics.

In various embodiments, the trigger condition discussed herein may comprise any of: a local monitoring event being detected; a determination of a local monitoring event being failed to be detected; a failure of the first SFC controller being detected; and/or a failure of the first SFC controller being predicted using local monitoring information.

In various embodiments, the trigger condition discussed herein may comprise any of: a local monitoring event is detected by the first SFC controller or the second SFC controller; a local monitoring event is failed to be detected by the first SFC controller or the second SFC controller; a failure of the first SFC controller is detected by the second SFC controller; and/or a failure of the first SFC controller is predicted by the second SFC controller using the local monitoring information.

In various embodiments, the failure of the first SFC controller may be detected by the second SFC controller based on any of: 1) signaling one or more periodic keep-alive messages between the first SFC controller and the second SFC controller; 2) a transport-layer mechanism that allows detecting connectivity failures; and/or observing a lack of action from the first SFC controller upon an event that requires an orchestration action.

In various embodiments, the WTRU may be configured to determine that the first SFC controller is unable to operate as the primary SFC controller. In response to the determination, the WTRU may be configured to send a notification message to at least the second SFC controller using an SFC NSH extension, and the WTRU may be configured to receive, from at least the second SFC controller, a response message after sending the notification message. The WTRU may be further configured to select the second SFC controller as the primary SFC controller based on the received response message.

Representative Procedure for P-CTRL Taking Over C-CTRL

In various embodiments, there are two main triggers for a P-CTRL to take over the SFC control and functions (e.g., performing local NS lifecycle management) from the C-CTRL: 1) a local monitoring event, and 2) a C-CTRL failure. The procedures for each of these two triggers is specified in the following embodiments or examples.

Representative Procedure for a P-CTRL Taking Over C-CTRL Due to a Local Monitoring Event In various embodiments, the C-CTRL has delegated some monitoring actions to the P-CTRL, as indicated in the OAMD sent by the C-CTRL to the P-CTRL.

Figure 7:
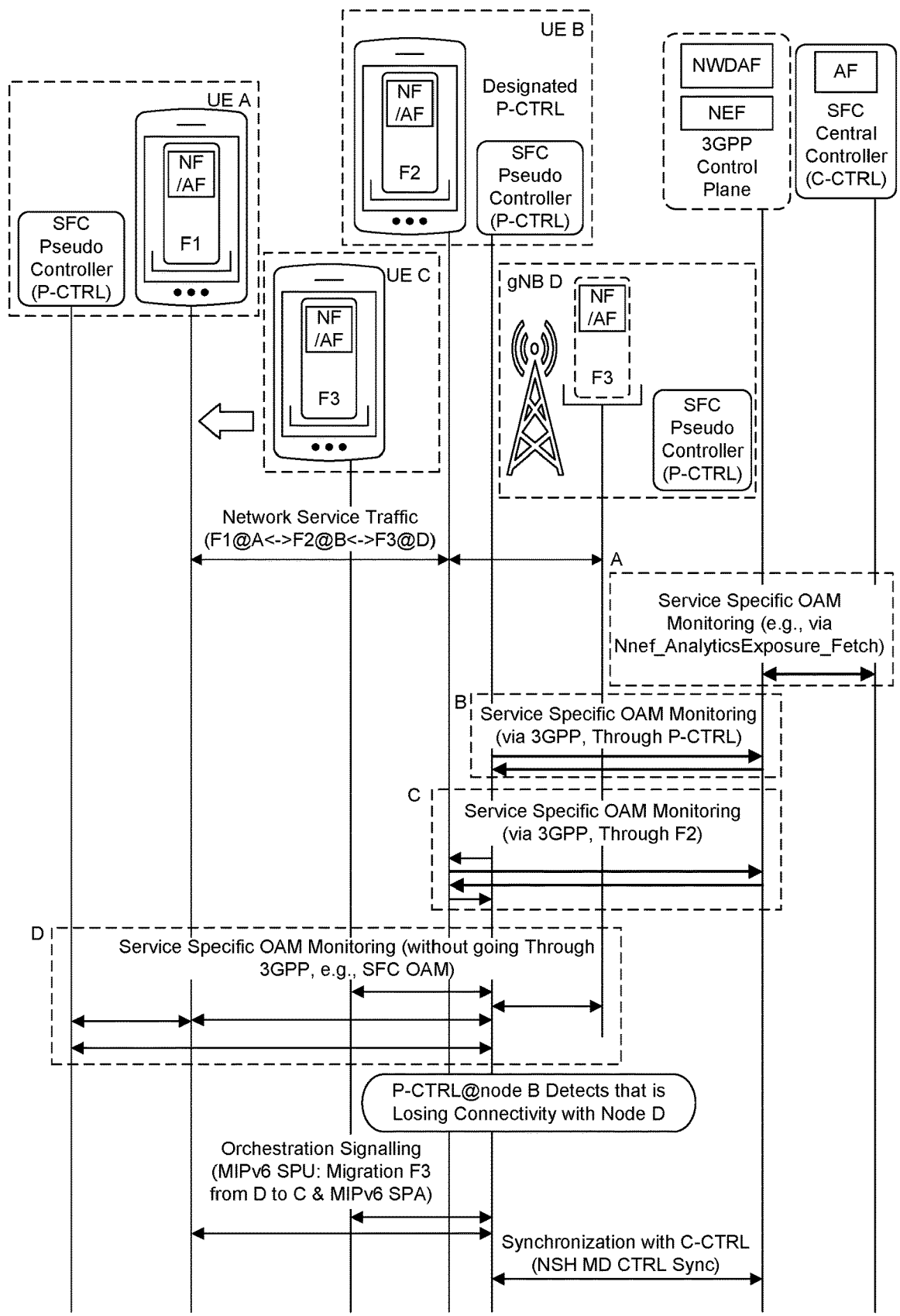
FIG. 7 is a signal flow chart illustrating an exemplary procedure of an SFC pseudo controller (P-CTRL) taking over a centralized SFC controller (C-CTRL) due to a local monitoring event, according to one or more embodiments.

Referring to FIG. 7, an example of a signaling flow chart is provided, which is described in detail as follow. In this example, it is assumed that the network service (NS) has been instantiated and the traffic is F1@A<->F2@B<->F3@D. The C-CTRL runs overall OAM monitoring of the NSs. For example, by contacting the 3GPP network, the C-CTRL may obtain different network analytics via NEF, as shown in FIG. 7, under box A. In an example, the overall OAM monitoring of the NSs may follow the procedures specified in Section 6.1.1.2 of 3GPP TS 23.288 (e.g., using Nnef_AnalyticsExposure_Fetch messages).

In various embodiments, P-CTRLs may run service-specific OAM monitoring actions, as indicated in the OAMD sent by the C-CTRL (in the network service instantiation procedure), which may require signaling procedures, including any of the following options:

The P-CTRL may directly obtain information metrics from different network functions through the network exposure function (NEF). An example is shown under box B in FIG. 7.

The P-CTRL may indirectly obtain the information metrics through a local AF or NF hosted on the WTRU, which interacts with any other entity inside or outside 3GPP (e.g., AF to AF, NF to AF, or NF to NF) and then parse these obtained information metrics on the interface to the P-CTRL. If the function hosted on the WTRU is an NF, and the information is about 3GPP network data analytics, then the NF will obtain some data from NWDAF and locally at the WTRU, expose these to the P-CTRL. An example is shown under box C in FIG. 7.

In addition to the former (mutually exclusive) approaches, standalone procedures may be used to perform local OAM monitoring, such as local OAM monitoring and the use of SFC OAM (see, e.g., Ref. [7]). An example is shown under box D in FIG. 7.

Still referring to FIG. 7, in various embodiments, the interface between the P-CTRL and the SFC functions, running on the WTRU to obtain OAM metrics, may be a local API, or a standard interface similar to IETF SFC OAM, or similar to the interface between 3GPP NWDAF and an NWDAF service consumer (see, e.g., Ref. [8]).

In various embodiments, procedures A to D in FIG. 7 are not all mutually exclusive. It is recommended that more than one are used simultaneously to enable P-CTRLs react timely and fast enough to complement the monitoring function performed by the C-CTRL alone.

In various embodiments, at a certain point in time, a local monitoring event that cannot be detected by the C-CTRL may trigger the whole process. In the example shown in FIG. 7, P-CTRL@node B may detect that a WTRU (e.g., UE B) is losing connectivity with node D.

In various embodiments, the P-CTRL takes an orchestration decision based on the P-CTRL's local knowledge and signals the orchestration decision to the involved nodes. The decision consists in migrating/moving F3 from node D to node C (e.g., UE C). New extensions to MIPv6 (e.g., SPU and SPA) may be used, as described below. Alternatively, extensions to IETF SFC NSH may also be used, as described below.

In various embodiments, the P-CTRL may inform the C-CTRL to keep the P-CTRL synchronized. Similarly, the C-CTRL may then update other P-CTRLs if needed. New extensions to NSH may be used (e.g., for NS lifecycle management), as described herein.

Figure 8:
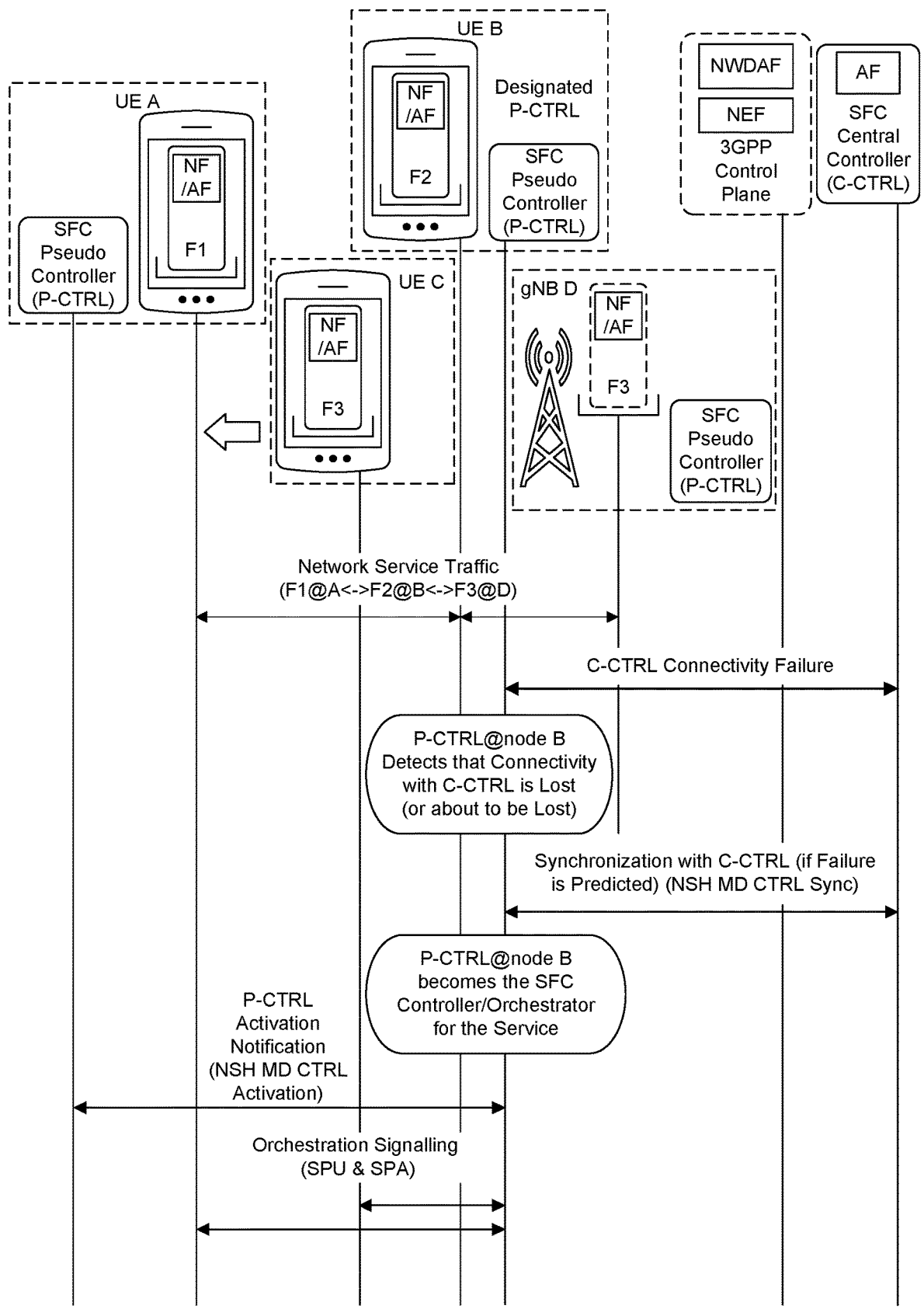
FIG. 8 is a signal flow chart illustrating an exemplary procedure of a P-CTRL taking over a C-CTRL due to a C-CTRL failure, according to one or more embodiments.

Representative Procedure for a P-CTRL Taking Over C-CTRL Due to a C-CTRL Failure In various embodiments, the P-CTRL may detect/predict a C-CTRL failure (e.g., the C-CTRL becomes unreachable). An example of a signaling message flow is shown in FIG. 8, which is described next. In FIG. 8, it is assumed that the NS has been instantiated and the traffic is F1@A<->F2@B<->F3@D.

In various embodiments, a failure may be detected by a P-CTRL via multiple mechanisms, such as: 1) sending periodic keep-alive messages to the C-CTRL; 2) transport-layer mechanisms that allow detecting connectivity failures; and/or 3) observing a lack of action from the C-CTRL upon an event that requires an orchestration action. A failure may also be predicted by a P-CTRL, by using local monitoring information.

In various embodiments, when a C-CTRL failure is detected, the designated backup P-CTRL takes over the orchestration of the NS, by any of the following operations:

Notifying other P-CTRLs, as well as selecting a new designated backup P-CTRL; and/or Synchronization of relevant information (e.g., orchestration data bases (DBs), descriptors, etc.) is performed with the C-CTRL (if the C-CTRL failure is predicted), for example, through using new IETF SFC NSH extensions (NS lifecycle management), as described herein.

The P-CTRL may then become the SFC controller/orchestrator, and the P-CTRL may send orchestration signaling. Extensions to IETF NSH or MIPv6 may be used, as described herein.

Representative Procedure for C-CTRL Gaining Back Control

Figure 9:
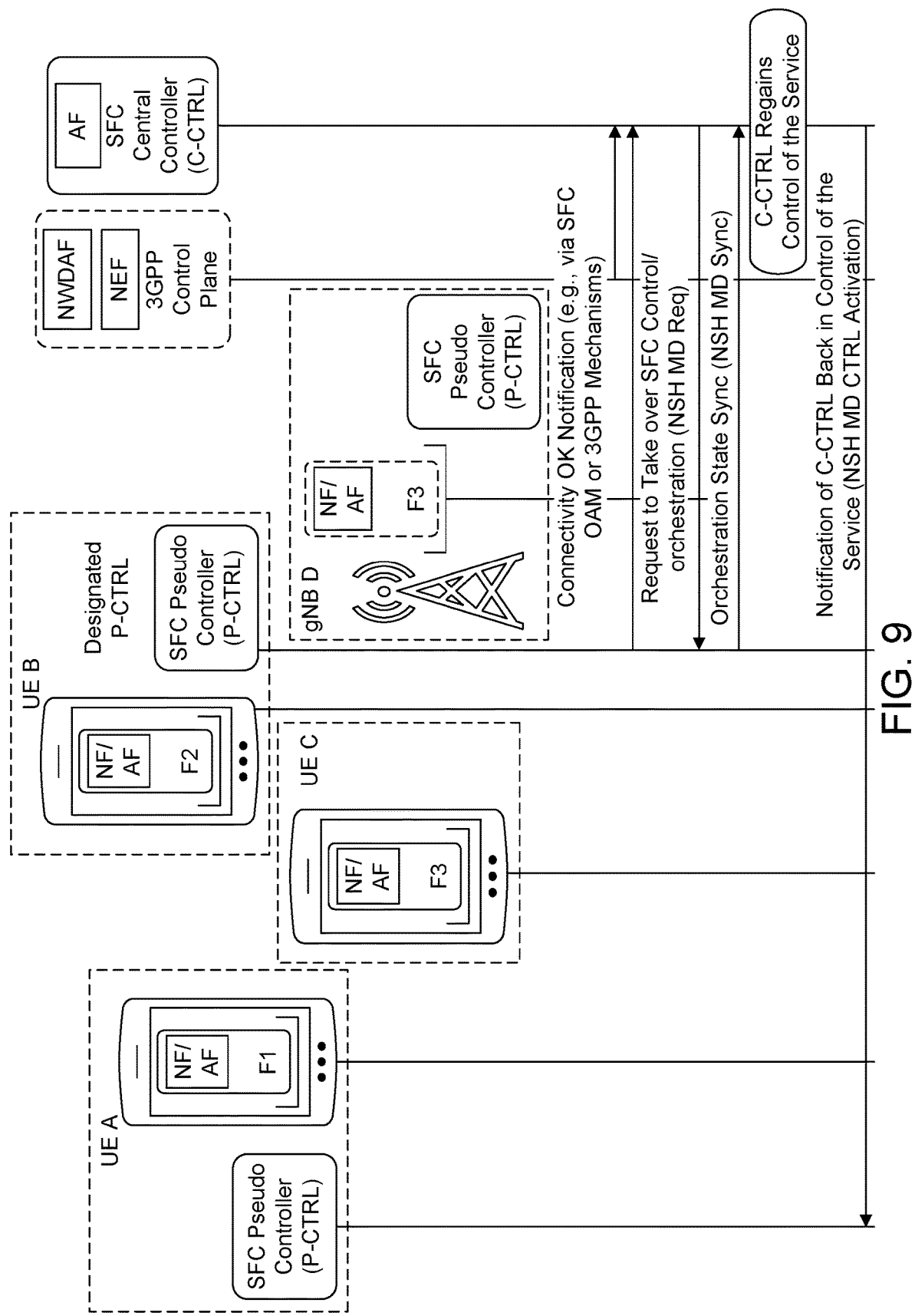
FIG. 9 is a signal flow chart illustrating an exemplary procedure of a C-CTRL gaining back orchestration control from a P-CTRL, according to one or more embodiments.

Referring to FIG. 9, in various embodiments, the C-CTRL may gain back the orchestration control, which is temporarily delegated to the P-CTRL. For example, when the C-CTRL loses connectivity with the nodes involved in a service or a NS, the C-CTRL may enter into a recovery mode, waiting for the connectivity to be recovered. The C-CTRL may learn that connectivity has been regained using NSH OAM signaling or 3GPP signaling from the NEF or the P-CTRL itself. When the connectivity or control is with the P-CTRL, the C-CTRL signals its availability so the P-CTRL can give back the control of the service. To do so, IETF SFC NSH extensions (NS lifecycle management) may be used, as described herein.

In various embodiments, after the C-CTRL signals its availability and gains the control back, the C-CTRL may become now the active SFC controller/orchestrator for the service. The C-CTRL may notify to other P-CTRLs that the C-CTRL is back in control of the service, using IETF SFC NSH extensions (NS lifecycle management), as described herein.

Representative Procedure for Seamless Inter P-CTRL Handover

In various embodiments, in scenarios with no C-CTRL reachability, it may be needed to transition from one P-CTRL to another one (e.g., because of mobility of the nodes while the C-CTRL is not reachable). Reactive transition is supported as for the case of C-CTRL failure. Proactive/seamless transition is addressed as follows.

Figure 10:
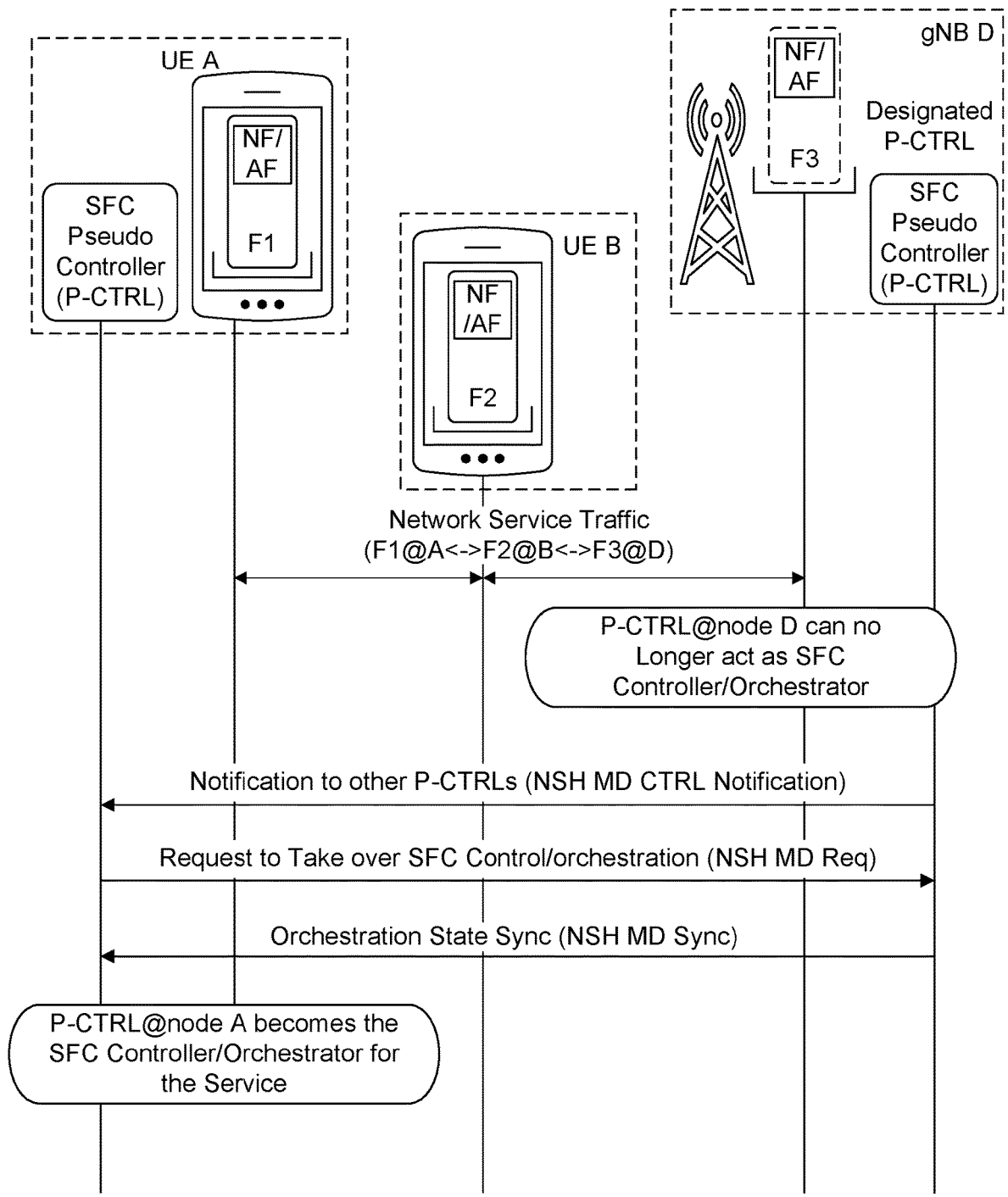
FIG. 10 is a signal flow chart illustrating an exemplary procedure of inter P-CTRL(s) handover, according to one or more embodiments.

Referring to FIG. 10, an example of inter P-CTRL handover is provided in a signaling flow chart, which is described in detail as follow. In this example, it is assumed that the network service (NS) has been instantiated and the traffic is F1@A<->F2@B<->F3@D. When the active (designated) P-CTRL detects that the active P-CTRL may not be able to operate in the near future (e.g., lack of resources, battery, moving away, etc.), a notification may be sent by the active P-CTRL to other P-CTRLs using new IETF SFC NSH extensions (e.g., for NS lifecycle management), as described herein. Each P-CTRL receiving the notification message (that is ready to take over the role of the active P-CTRL) sends a message (e.g., a response message) to the current P-CTRL, and the current/active P-CTRL selects a new P-CTRL (e.g., from the P-CTRLs that responded to the notification message). New IETF SFC NSH extensions may be used to convey this signaling. At this point, the newly selected P-CTRL may become the SFC controller/orchestrator of the service.

Representative Procedure for In-Band Local Orchestration Signaling Extending NSH In various embodiments, several NSH (see, e.g., Ref. [2]) extensions may be used to provide in-band NS lifecycle management signaling.

Figures 11, 12, 13:
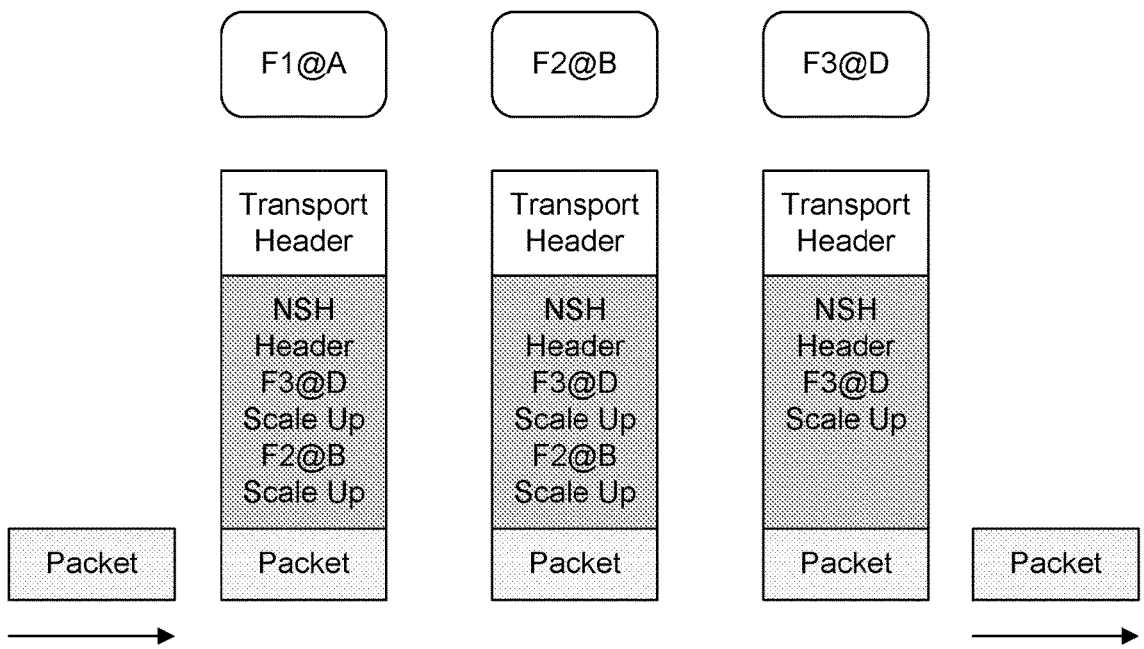
FIG. 11 is a block diagram illustrating an example of signaling mechanisms of in-band network service (NS) lifecycle management signaling extending NSH, according to one or more embodiments.
FIG. 12 is a diagram illustrating an exemplary format of an NSH metadata (MD) type, according to one or more embodiments.
FIG. 13 is a diagram illustrating an exemplary format of a variable-length NS lifecycle management commands field, according to one or more embodiments.

In an example, new NSH extensions are used in a scenario described above (referring to FIG. 4). In this scenario, there may be no mobility, so mobile nodes are not moving out of the radio coverage of a gNB node (e.g., node D). In this scenario, at a given point in time the service demands may increase, which requires F2 (running at node B) and F3 (running at node D) to have more resources allocated, as otherwise the service would not meet the required SLA. The increased demands are detected by the P-CTRL through service-specific local OAM monitoring. Once detected the need of scaling up the resources at nodes B and D, the P-CTRL notifies this need through in-band signaling in the actual data packets processed by the SF Chain, which is shown in FIG. 11. In various embodiments, the use of in-band signaling may provide an efficient way of conveying the signaling, as well as support multiple NS lifecycle management operations (even addressing different nodes) to be conveyed in a single message.

In various embodiments, NS lifecycle management commands conveyed in the NSH may be transported as a new NSH metadata (MD) type (e.g., Type 3, as current NSH specifications only support 2 types), shown in FIG. 12.

In various embodiments, the new variable-length field for NS lifecycle management commands (format shown in FIG. 13) includes any of:
- NS lifecycle cmd: the NS lifecycle management command, which may include any of the following commands: scale in, scale out, scale up, scale down, instantiate function, terminate function, configure function, upgrade function, update function, onboard VNFD, onboard OAMD, sync state, request to overcome CTRL, and/or CTRL activation.
- Type: indicates the explicit type of a command carried out. The type may depend on the orchestration framework implementation.
- U (Unassigned bit): an unassigned bit for future use. In various embodiments, this unassigned bit is not set, and would be ignored on receipt.
- Length: indicates the length of the variable-length metadata, in bytes. In case the metadata length is not an integer number of 4-byte words, the sender adds pad bytes immediately following the last metadata byte to extend the metadata to an integer number of 4-byte words. The receiver rounds the Length field up to the nearest 4-byte-word boundary, to locate and process the next field in the packet. The receiver accesses only those bytes in the metadata indicated by the Length field (e.g., actual number of bytes) and ignores the remaining bytes up to the nearest 4-byte-word boundary. The length may be 0 or greater.

Representative Procedure for Out-of-Band Function Mobility Signaling Extending Mobile IPv6

In various embodiments, Mobile IPv6 (MIPv6) extensions may be used to perform function migration/mobility. Updating the location of a given function is an example of NS lifecycle management operation and may be considered as a function mobility. The function mobility (the update of the location of a given function) may involve (or not involve) the actual migration of the function.

Figure 14:
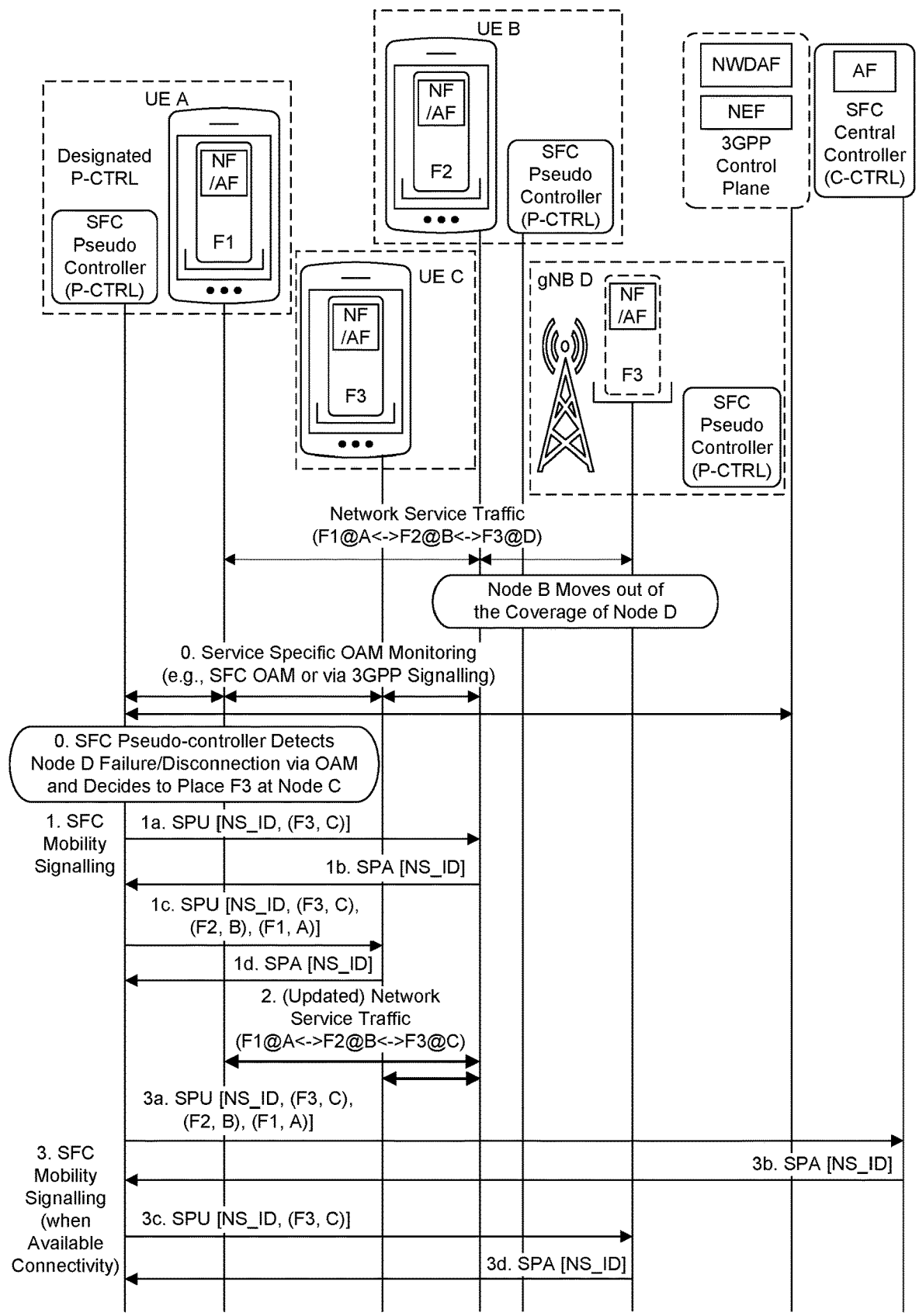
FIG. 14 is a message flow chart illustrating an exemplary procedure of SFC mobility signaling, according to one or more embodiments.

In various embodiments, referring to FIG. 14, signaling extensions (e.g., MIPv6 extensions) are used to perform function migration/mobility. In an example, a function (which location being updated) has already been available at a new target node (if not, the function needs to be previously or currently migrated using any mechanisms available in the state-of-the-art). The procedure for mobility is represented in FIG. 14, where the network service (NS) F1<->F2<->F3 is already instantiated and running. The only SFC pseudo controller (P-CTRL) active at this point is running at node A (or UE A), and there is a candidate SFC pseudo controller (P-CTRL) at node B (or UE B). Assuming the node B is moving out of the coverage of the node D (e.g., a gNB). The operations may include any of:

0. The movement (node B is moving out of the coverage of node D) is detected by the active (or designated) pseudo controller (P-CTRL) running at node A, via local monitoring (e.g., service-specific OAM). The mechanisms/signaling procedures required to obtain the information for the local monitoring are the ones described before for "P-CTRL taking over C-CTRL due to a local monitoring event."
1. The active P-CTRL may send mobility signaling to all affected nodes, for example, node B (as node B needs to update the NS path due to the F3 location update) and node C (as node C starts being part of the SF Chain, hosting F3). The signaling messages are new mobility messages including, for example, Service Path Update (SPU) message and Service Path Acknowledgement (SPA) message, which may contain:

The identifier of the network service (e.g., NS_ID), and/or

The updated elements of the network service path (ID, updated location).

The SPA may be used to acknowledge that the procedure has been performed correctly.

2. The NS "F1<->F2<->F3" is being updated so the NS path now runs at nodes A, B and C from previously running at nodes A, B and D.
3. Whenever connectivity with node D and/or the centralized SFC controller (C-CTRL) is back or recovered, the pseudo controller (P-CTRL) may inform/indicate the updated SFC path, sending SPU messages, which are acknowledged with SPA messages.

The function mobility disclosed above is one example of NS lifecycle management by an SFC pseudo controller (P-CTRL), while other operations or examples of NS lifecycle management may be performed by the C-CTRL and/or one or more P-CTRLs, such as: scaling up/down, scaling in/out, termination, etc.

Representative Procedure for New MIPv6 Messages

Figure 15:
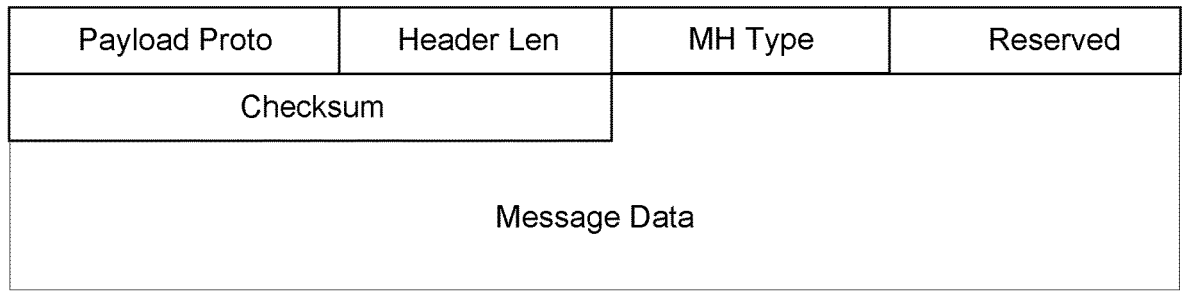
FIG. 15 is a diagram illustrating an exemplary format of a Mobility Header in Mobile IPv6, according to one or more embodiments.

Mobile IPv6 (MIPv6) defines a Mobility Header, identified by a Next Header value of 135 in the immediately preceding header. MIPv6 may have the format shown in FIG. 15, and the fields of the message/format may be defined as the following:

Payload Proto: an 8-bit selector that identifies the type of header immediately following the Mobility Header.

Header Len: an 8-bit unsigned integer, representing the length of the Mobility Header in units of 8 octets, excluding the first 8 octets. The length of the Mobility Header is a multiple of 8 octets.

MH Type: an 8-bit selector that identifies a particular mobility message.

Reserved: an 8-bit field reserved for future use. The value is initialized to zero by the sender, and is ignored by the receiver.

Checksum: a 16-bit unsigned integer. This field contains the checksum of the Mobility Header.

Message Data: a variable-length field containing the data specific to the indicated Mobility Header (MH) type.

MIPv6 also defines a number of "mobility options" for use within these messages. In various embodiments, a new mobility option, Service Path Update (SPU), may be defined and used in, for example, local lifecycle management and SFC control.

Representative Procedure for Service Path Update (SPU)

In various embodiments, a Service Path Update (SPU) message is used by a CTRL (e.g., a C-CTRL or a P-CTRL) to notify nodes (e.g., a Service Function Forwarder (SFF)) in an SF Chain that there is an update of the service path or SF path. The Service Path Update may use an MH Type value TBD. When the value TBD is indicated in the MH Type field (or determined by a CTRL), the format of the Message Data field in the Mobility Header is shown in FIG. 16.

Figure 16:
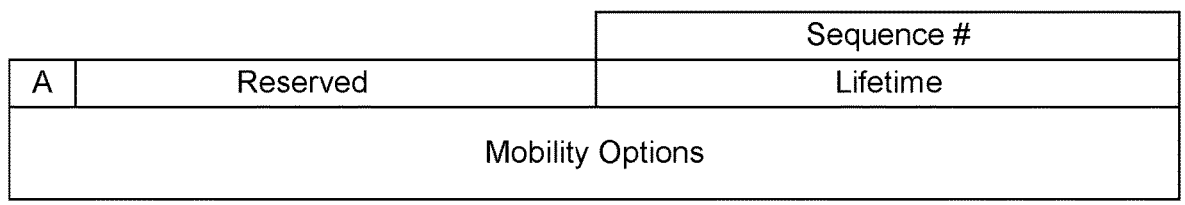
FIG. 16 is a diagram illustrating an exemplary format of a Service Path Update (SPU) message, according to one or more embodiments.

Referring to FIG. 16, the fields of the message/format may be defined as the following:

Acknowledge (A): an Acknowledge (A) bit is set by the sending mobile node to request a Service Path Acknowledgement (SPA) be returned upon receipt of the SPU.

Reserved: These fields are unused. These fields are initialized to zero by the sender and are ignored by the receiver.

Sequence Number: a 16-bit unsigned integer used by the receiving node to sequence Binding Updates and by the sending node to match a returned SPA with this SPU.

Lifetime: a 16-bit unsigned integer. This is the number of time units remaining before the service path being considered expired. A value of zero indicates that the Service Path shall be deleted. A value of 0xFFFF indicates an infinite lifetime for the Service Path. One time unit is 4 seconds.

Mobility Options: a variable-length field of such length that the complete Mobility Header is an integer multiple of 8 octets long. This field contains zero or more TLV-encoded mobility options. The receiver ignores and skips any options that the receiver does not understand.

The following options are valid in an SPU:
Network Service ID.
SFC node.

Representative Procedure for Service Path Acknowledgement (SPA)

In various embodiments, the Service Path Acknowledgement (SPA) message is used by a CTRL to acknowledge a received SPU. The SPA may use an MH Type value TBD. When the value TBD is indicated in the MH Type field (or determined by a CTRL), the format of the Message Data field in the Mobility Header is shown in FIG. 17.

Figure 17:
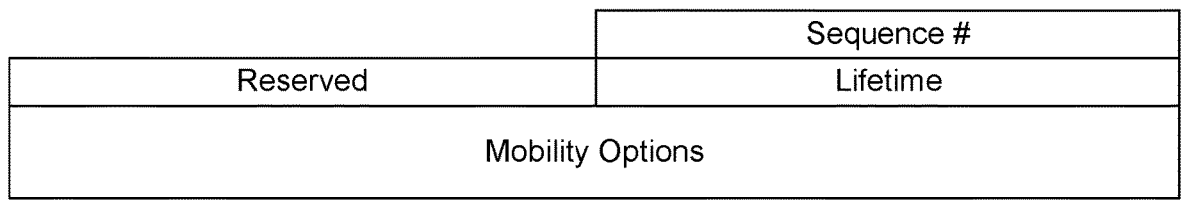
FIG. 17 is a diagram illustrating an exemplary format of a Service Path Acknowledgement (SPA) message, according to one or more embodiments.

Referring to FIG. 17, the fields of the message/format may be defined as the following:

Reserved: These fields are unused. These fields are initialized to zero by the sender and are ignored by the receiver.

Sequence #: a 16-bit unsigned integer used to match the returned SPA with the SPU.

Lifetime: a 16-bit unsigned integer. This is the number of time units remaining before the service path being considered expired. A value of zero indicates that the Service Path shall be deleted. A value of 0xFFFF indicates an infinite lifetime for the Service Path. One time unit is 4 seconds.

Mobility Options: a variable-length field of such length that the complete Mobility Header is an integer multiple of 8 octets long. This field contains zero or more TLV-encoded mobility options. The receiver ignores and skips any options that the receiver does not understand.

The following options are valid in an SPA: Network Service ID.

Representative Procedure for New Mobility Options—Network Service ID

In various embodiments, the Network Service ID option may have the format shown in FIG. 18. Referring to FIG. 18, the fields of the Network Service ID option may be defined as the following:

Option Type: TBA (by the Internet Assigned Numbers Authority (IANA)).

Option Length: an 8-bit unsigned integer. Length of the option, in octets, excluding the Option Type and Option Length fields.

Service Path Identifier (SPI): uniquely identifies a Service Function Path (SFP). Participating nodes use this identifier for SFP selection. The initial Classifier sets the appropriate SPI for a given classification result.

Service Index (SI): provides location(s) within an SFP.

Network Service ID: a variable length field that identifies the network service.

Representative Procedure for New Mobility Options—SFC Node

In various embodiments, an SFC node option may have the format shown in FIG. 19. Referring to FIG. 19, the fields of the SFC node option may be defined as the following:

Option Type: TBA by IANA.

Option Length: an 8-bit unsigned integer. Length of the option, in octets, excluding the Option Type and Option Length fields.

Function ID Length: an 8-bit unsigned integer. Length of the Function ID field, in octets.

Node ID Length: an 8-bit unsigned integer. Length of the Node ID field, in octets.

Function ID: a variable length field that identifies the function.

Node ID: a variable length field that identifies the node.

In various embodiments, there may be multiple SFC node options in a Service Function Update message, following the options the same order of the SFC/NS.

Each of the following references are incorporated by reference herein: [1] J. Halpern (Ed.), "Service Function Chaining (SFC) Architecture", RFC 7665, October 2015; [2] P. Quinn (Ed.), "Network Service Header (NSH)", RFC 8300, January 2018; [3] C. Perkins (Ed.), "Mobility Support in IPv6", RFC 6275, July 2011; [4] S. Gundavelli (Ed.), "Proxy Mobile IPv6", RFC 5213, August 2008; [5] U.S. Provisional Patent Application No. 62/870,851; [6] W. Haeffner et al., "Service Function Chaining Use Cases in Mobile Networks", draft-ietf-sfc-use-case-mobility-09, January 2019; [7] S. Aldrin (Ed.), "Service Function Chaining (SFC) Operations, Administration and Maintenance (OAM) Framework", draft-ietf-sfc-oam-framework-11, September 2019; [8] 3rd Generation Partnership Project; Technical Specification Group Services and System Aspects; Architecture enhancements for 5G System (5GS) to support network data analytics services (Release 16), 3GPP TS 23.288 V16.2.0; and [9] A. Farrel, J. Drake, "Operating the Network Service Header (NSH) with Next Protocol "None"", RFC 8393, May 2018.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:

1. A method implemented in a wireless transmit/receive unit (WTRU) for wireless communications, the method comprising:
    determining, by the WTRU, that a first Service Function Chaining (SFC) controller of a set of SFC controllers is a primary SFC controller;
    determining, by the WTRU, whether at least one trigger condition is satisfied;
    selecting, by the WTRU from the set of SFC controllers, a second SFC controller as the primary SFC controller to substitute the first SFC controller based on the at least one trigger condition being satisfied;
    receiving an Operations, Administration and Maintenance Descriptor (OAMD) from the first SFC controller; and
    determining one or more service-specific monitoring actions to be performed and/or a service-specific configuration based on the received OAMD.

2. The method of claim 1, wherein the selecting the second SFC controller comprises reselecting the second SFC controller as the primary SFC controller to substitute the first SFC controller.

3. The method of claim 1, wherein the second SFC controller is selected based on information related to any of: 1) a service-specific configuration, or 2) a network service (NS) associated with the primary SFC controller.

4. The method of claim 1, further comprising:
    performing the one or more service-specific monitoring actions based on the received OAMD, wherein the one or more service-specific monitoring actions comprise any of: 1) a service-specific local Operations, Administration and Maintenance (OAM) monitoring, or 2) obtaining one or more OAM metrics.

5. The method of claim 1, wherein the at least one trigger condition comprises any of:
    a local monitoring event being detected;
    a determination of a local monitoring event being failed to be detected;
    a failure of the first SFC controller being detected; or
    a failure of the first SFC controller being predicted using local monitoring information.

6. The method of claim 5, wherein:
    the local monitoring event is detected by the first SFC controller or the second SFC controller;
    the local monitoring event is failed to be detected by the first SFC controller or the second SFC controller;
    the failure of the first SFC controller is detected by the second SFC controller; or
    the failure of the first SFC controller is predicted by the second SFC controller using the local monitoring information.

7. The method of claim 5, wherein the failure of the first SFC controller is detected by the second SFC controller based on any of:
    signaling one or more periodic keep-alive messages between the first SFC controller and the second SFC controller;
    a transport-layer mechanism that allows detecting connectivity failures; or
    observing a lack of action from the first SFC controller upon an event that requires an orchestration action.

8. The method of claim 1, wherein the second SFC controller communicates with one or more SFC controllers of the set of SFC controllers.

9. The method of claim 1, wherein the first SFC controller is a centralized SFC controller, and the second SFC controller is a distributed SFC pseudo controller.

10. The method of claim 1, wherein at least one of the first SFC controller and the second SFC controller is a distributed SFC pseudo controller.

11. The method of claim 1, wherein at least one of the first SFC controller and the second SFC controller is a centralized SFC controller.

12. The method of claim 1, wherein the second SFC controller continuously performs local monitoring.

13. The method of claim 1, further comprising:
    determining, by the first SFC controller, that the first SFC controller is unable to operate as the primary SFC controller;
    sending, by the first SFC controller, a notification message to at least the second SFC controller using an SFC Network Service Header (NSH) extension;
    receiving, by the first SFC controller from at least the second SFC controller, a response message after sending the notification message; and
    selecting, by the first SFC controller, the second SFC controller as the primary SFC controller based on the received response message.

14. A wireless transmit/receive unit (WTRU) for wireless communications, the WTRU comprising
    a processor; and
    a transceiver operably coupled to the processor, the processor and transceiver configured to:
    determine, that a first Service Function Chaining (SFC) controller of a set of SFC controllers is a primary SFC controller;

determine, whether at least one trigger condition is satisfied;

select from the set of SFC controllers, a second SFC controller as the primary SFC controller to substitute the first SFC controller based on the at least one trigger condition being satisfied;

receive an Operations, Administration and Maintenance Descriptor (OAMD) from the first SFC controller; and determine one or more service-specific monitoring actions to be performed and/or a service-specific configuration based on the received OAMD.

15. The WTRU of claim 14, wherein the processor is configured to reselect the second SFC controller as the primary SFC controller to substitute the first SFC controller.

16. The WTRU of claim 14, wherein the processor is configured to select the second SFC controller based on information related to any of: 1) a service-specific configuration, or 2) a network service (NS) associated with the primary SFC controller.

17. The WTRU of claim 14, wherein at least one of the first SFC controller and the second SFC controller is a distributed SFC pseudo controller; or at least one of the first SFC controller and the second SFC controller is a centralized SFC controller; or the WTRU comprises at least one of the first SFC controller and the second SFC controller.

18. The WTRU of claim 14, wherein the processor is configured to determine that the first SFC controller is unable to operate as the primary SFC controller, the transceiver comprises a transmitter and a receiver, wherein the transmitter is configured to send a notification message to at least the second SFC controller using an SFC Network Service Header (NSH) extension, and the receiver is configured to receive, from at least the second SFC controller, a response message after sending the notification message, and the processor is further configured to select the second SFC controller as the primary SFC controller based on the received response message.

* * * * *